United States Patent
Zhu et al.

(10) Patent No.: US 12,554,277 B2
(45) Date of Patent: Feb. 17, 2026

(54) CONTROL METHOD FOR LIGHT SOURCES OF VISION MACHINE, AND VISION MACHINE

(71) Applicant: HANGZHOU EZVIZ SOFTWARE CO., LTD., Hangzhou (CN)

(72) Inventors: Jianhua Zhu, Hangzhou (CN); Bin Guo, Hangzhou (CN); Anqiang Du, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 826 days.

(21) Appl. No.: 17/782,434

(22) PCT Filed: Dec. 2, 2020

(86) PCT No.: PCT/CN2020/133465
§ 371 (c)(1),
(2) Date: Jun. 3, 2022

(87) PCT Pub. No.: WO2021/110070
PCT Pub. Date: Jun. 10, 2021

(65) Prior Publication Data
US 2023/0009071 A1 Jan. 12, 2023

(30) Foreign Application Priority Data
Dec. 6, 2019 (CN) .......................... 201911240379.2

(51) Int. Cl.
*G05D 25/02* (2006.01)
*G05D 1/00* (2024.01)
(Continued)

(52) U.S. Cl.
CPC ............. *G05D 25/02* (2013.01); *G05D 1/242* (2024.01); *G05D 1/43* (2024.01); *G05D 1/622* (2024.01);
(Continued)

(58) Field of Classification Search
CPC .... G05D 25/02; G05D 1/0246; G05D 1/0242; G05D 1/242–2427; G05D 1/622–637;
(Continued)

(56) References Cited

U.S. PATENT DOCUMENTS

| | | | |
|---|---|---|---|
| 8,848,927 B2* | 9/2014 | Takita | H04N 9/8216 381/26 |
| 2003/0089776 A1* | 5/2003 | Hennick | G06K 13/08 235/454 |

(Continued)

FOREIGN PATENT DOCUMENTS

| | | |
|---|---|---|
| CN | 101504280 | 8/2009 |
| CN | 101852396 | 10/2010 |

(Continued)

OTHER PUBLICATIONS

Yang D—English description of CN-203587931-U via Espacenet Patent Translate, retrieved Feb. 3, 2025. (Year: 2025).*

(Continued)

*Primary Examiner* — Erin M Piateski
*Assistant Examiner* — Paul Allen
(74) *Attorney, Agent, or Firm* — NORTON ROSE FULBRIGHT US LLP

(57) ABSTRACT

A control method for light sources of a vision machine and the vision machine. The control method includes the following steps: activating at least one first light source among n light sources to sense spatial information of an object in a field of view; and selectively activating the n light sources according to the spatial information of a sensed object; wherein the n light sources are distributed on a periphery of a front mirror surface of a lens of the vision machine, and n is a natural number greater than or equal to 2. The embodiment of the present disclosure enlarges the field of view of the vision machine, capable of providing corresponding (Continued)

light illumination based on environmental requirements, reducing the interference signal caused by reflection of a single light source, expanding the sensing range of the vision machine, and improving the sensing ability.

12 Claims, 15 Drawing Sheets

(51) Int. Cl.
    *G05D 1/242*     (2024.01)
    *G05D 1/43*     (2024.01)
    *G05D 1/622*     (2024.01)
    *G05D 109/10*     (2024.01)
    *G05D 111/10*     (2024.01)

(52) U.S. Cl.
    CPC ...... *G05D 2109/10* (2024.01); *G05D 2111/14* (2024.01)

(58) Field of Classification Search
    CPC ...... G05D 2111/14; G05D 1/00; H04N 23/56; H04N 23/61; A47L 2201/04
    See application file for complete search history.

(56) References Cited

U.S. PATENT DOCUMENTS

| | | | |
|---|---|---|---|
| 2005/0234594 | A1 | 10/2005 | Uehigashi |
| 2008/0122927 | A1* | 5/2008 | Konno .................. H04N 7/183 348/E5.029 |
| 2010/0177319 | A1 | 7/2010 | Towers et al. |
| 2012/0019612 | A1* | 1/2012 | Choudury ............ H04N 13/111 348/36 |
| 2012/0320218 | A1* | 12/2012 | Mori ...................... H04N 23/56 348/E5.09 |
| 2015/0193934 | A1* | 7/2015 | Fuchikami ................ G06T 7/74 348/142 |
| 2016/0135765 | A1 | 5/2016 | Vigdor et al. |
| 2016/0306358 | A1* | 10/2016 | Kang .................. G05D 1/0248 |
| 2017/0332871 | A1* | 11/2017 | Sung ...................... G01S 17/46 |
| 2017/0332872 | A1* | 11/2017 | Jun ...................... A47L 11/4066 |
| 2017/0336796 | A1* | 11/2017 | Jun ........................ A47L 9/0472 |
| 2018/0050634 | A1 | 2/2018 | White et al. |
| 2018/0124382 | A1* | 5/2018 | Smith ...................... G06T 7/55 |
| 2019/0018106 | A1* | 1/2019 | Skowronek ............ G01S 17/66 |
| 2019/0018141 | A1* | 1/2019 | Holz ...................... G01S 17/48 |
| 2020/0037498 | A1* | 2/2020 | Ko ........................ G06Q 30/02 |
| 2020/0068103 | A1* | 2/2020 | Huang .................. H04N 23/54 |
| 2020/0164814 | A1* | 5/2020 | Solar ...................... G06V 10/145 |
| 2020/0195816 | A1* | 6/2020 | Stein ...................... H04N 23/56 |
| 2020/0320725 | A1* | 10/2020 | Rossi .................... H04N 23/56 |
| 2020/0382707 | A1* | 12/2020 | Berton .................. H04N 23/90 |
| 2021/0228047 | A1* | 7/2021 | López Estévez ... A47L 11/4011 |
| 2021/0232840 | A1* | 7/2021 | Shiraishi ................ H04N 23/56 |

FOREIGN PATENT DOCUMENTS

| | | | | |
|---|---|---|---|---|
| CN | 101982966 | | 3/2011 | |
| CN | 102205321 | | 10/2011 | |
| CN | 102288969 | | 12/2011 | |
| CN | 102780845 | | 11/2012 | |
| CN | 102997866 | | 3/2013 | |
| CN | 103672500 | | 3/2014 | |
| CN | 203587931 | U * | 5/2014 | |
| CN | 104297162 | | 1/2015 | |
| CN | 104932507 | | 9/2015 | |
| CN | 105589285 | | 5/2016 | |
| CN | 105913410 | | 8/2016 | |
| CN | 106382920 | | 2/2017 | |
| CN | 106662877 | | 5/2017 | |
| CN | 107367737 | | 11/2017 | |
| CN | 107800948 | | 3/2018 | |
| CN | 109141273 | | 1/2019 | |
| CN | 208691387 | | 4/2019 | |
| CN | 109822598 | | 5/2019 | |
| CN | 209044170 | | 6/2019 | |
| CN | 110246114 | | 9/2019 | |
| EP | 1731941 | | 12/2006 | |
| EP | 3349087 | | 7/2018 | |
| KR | 20120114050 | A * | 10/2012 | ............ H04N 23/55 |
| KR | 20150033238 | | 4/2015 | |
| WO | WO 2019/190647 | | 10/2019 | |

OTHER PUBLICATIONS

Oh C—English description of KR-20120114050-A via Espacenet Patent Translate, retrieved Jan. 29, 2025. (Year: 2025).*
Notification on Grant of Patent Right for Invention issued in corresponding Chinese Application No. 201911240379.2, dated Jul. 6, 2022 (English Translation provided).
Garg et al., "Camera and Light Source Placement: a Multi-Objective Approach" *2011 Third National Conference on Computer Vision, Pattern Recognition, Image Processing and Graphics*, IEEE Computer Society, 2011, 187-191.
International Search Report and Written Opinion issued in Corresponding PCT Application No. PCT/CN2020/133465, dated Feb. 26, 2021 (English Translation provided).
*Research on Achieving Ranging and Space Information with Improved Spotlight in Dark Environment.* Lanzhou Jiaotong University, Apr. 25, 2016 (English Abstract provided).
*Research on the System for High Precision Measurement Based on Machine Vision.* Shenyang University of Technology, Feb. 28, 2016 (English Abstract provided).
Extended European Search Report issued in corresponding European Application No. 20895368.7, dated Dec. 15, 2022.

* cited by examiner

CONTROL METHOD FOR LIGHT SOURCES OF VISION MACHINE, AND VISION MACHINE

CROSS REFERENCE TO RELATED APPLICATIONS

The present application is a national phase application under 35 U.S.C. § 371 of International Application No. PCT/CN2020/133465, filed Dec. 2, 2020, which claims the benefit of priority to Chinese patent application No. 201911240379.2 filed with the China National Intellectual Property Administration on Dec. 6, 2019, and entitled "CONTROL METHOD FOR LIGHT SOURCES OF VISION MACHINE, AND VISION MACHINE", each of which are incorporated herein by reference in their entirety.

TECHNICAL FIELD

The present disclosure relates to the technical field of vision machines, in particular to a control method for light sources of a vision machine, and a vision machine.

BACKGROUND

Vision machines have been widely used with the development of machine vision technology. For example, the machine vision technology is applied to mobile robots. At present, vision machines mainly adopt TOF (Time of Flight) cameras and structured light cameras. The working principle of the TOF camera and the structured light camera is as follows: an infrared light source is used to illuminate the surrounding environment, and a light signal captured by a camera lens is imaged on an image sensor to obtain the spatial information of an object in a world coordinate system.

Taking the TOF camera as an example, the TOF camera includes an illumination (light source) subsystem and an image acquisition subsystem, wherein the image acquisition subsystem includes a camera lens composed of one or more lenses, and an image sensor module for converting optical signals into electrical signals. The camera lens captures the infrared light reflected from the surface of the object, and determines a distance between the object and the lens by calculating TOFs of the emitted light and the received light. Referring to FIG. 1, it is a schematic diagram of the positional relationship between the infrared light source and the lens. For the convenience of calibration, and for the integrity and compactness of the design, as shown in a front view in FIG. 1, the infrared light source for illumination is generally arranged around the camera lens; as shown in a side view in FIG. 1, an axis of the infrared light source is basically parallel to an optical axis of the lens, where the axis of the infrared light source is a main emission direction of the infrared light source.

As for the TOF camera installed on the mobile robot, as shown in FIG. 2a, if the infrared light source is installed below the lens, the lens (image sensor) may only sense the surface of the object that is illuminated by the light source when facing the object with a certain height. In this way, the TOF camera may only obtain the data about a side of the object facing the lens. As shown in FIG. 2b, when the axis of the infrared light source is parallel to the optical axis of the lens, a large amount of light emitted by the infrared light source will illuminate the ground, or the light emitted by the infrared light source will be reflected to the ground by the surface of the object (thick solid line in FIG. 2b). When the ground is smooth, the light reflected to the ground will easily form a "reflection" of the object on the ground, which is then sensed by the lens (image sensor) (interference signals caused by the thick solid line in FIG. 2b), resulting in obtaining of many error signals by the TOF camera. As shown in FIG. 2c, due to the existence of the field of view (FOV) of the lens and the light source FOV, only the objects in the area where the light source FOV and the lens FOV overlap may be sensed. If the obstacle avoidance of the mobile robot is carried out based on the light source FOV and the Lens FOV, there will be existed a large blind zone, resulting in inability to accurately sense obstacles in the travelling direction.

SUMMARY

In view of this, the embodiment of the present disclosure provides a control method for light sources of a vision machine and a vision machine, to improve the range of the viewing angle of the vision machine.

The embodiment of the present disclosure provides a control method for light sources of a vision machine, which includes the following steps:

activating at least one first light source among n light sources to sense spatial information of an object in a field of view; and selectively activating the n light sources according to the spatial information of a sensed object;

wherein the n light sources are distributed on a periphery of a front mirror surface of a lens of the vision machine, and n is a natural number greater than or equal to 2.

Alternatively, the periphery is a circumference having a first radius, and taking a center of the front mirror surface as a circle center, and the first radius is at least larger than a radius of the front mirror surface; wherein selectively activating the n light sources according to the spatial information of a sensed object includes:

selectively activating a light source among the n light sources, whose field of view corresponds to a space of the sensed object, according to a position and/or a height of the sensed object; and determining whether the height of the sensed object is lower than an optical axis of the lens when the sensed object is within a sensitive distance of the vision machine, and if the height of the sensed object is lower than the optical axis of the lens, activating at least one second light source among the n light sources to illuminate an upper surface of the sensed object.

Alternatively, n is 2, the second light source is an upper light source located on an upper side of the lens, the first light source is a lower light source located at a lower side of the lens, and emitted light of the upper light source illuminates at a depression angle relative to the optical axis of the lens; and wherein selectively activating a light source among the n light sources, whose field of view corresponds to a space of the sensed object, according to a position and/or a height of the sensed object further includes deactivating the lower light source when the upper light source is activated.

Alternatively, n is 2, the second light source is a left light source located on a left side of the lens, and the first light source is a right light source located on a right side of the lens; and wherein selectively activating a light source among the n light sources, whose field of view corresponds to a space of the sensed object, according to a position and/or a height of the sensed object includes:
if the sensed object is located on a left side of a traveling direction of the vision machine, activating the left light source of the vision machine;
if the sensed object is located on a right side of the traveling direction of the vision machine, activating the right light source of the vision machine; and
if the sensed object is located in the middle of the traveling direction of the vision machine, or there are sensed objects on a left side and a right side of the vision machine at the same time, activating the left light source and the right light source at the same time, or activating the left light source and the right light source alternately in a time-division manner at a certain frequency.

Alternatively, the left light source and the right light source are on the same straight line with the center of the front mirror surface and symmetrically distributed on both sides of the lens.

Alternatively, the upper light source and the lower light source are on the same straight line with the center of the front mirror surface, a distance between the upper light source and the center of the front mirror surface is larger than that between the lower light source and the center of the front mirror surface, and emitted light of the lower light source illuminates at an elevation angle relative to the optical axis of the lens, or the lower light source is installed with a homogenizer which enables the emitted light to be emitted at an elevation angle relative to the optical axis of the lens.

Alternatively, activating at least one first light source of the n light sources includes: activating all light sources among the n light sources, or activating each light source among the n light sources alternately in a time-division manner at a certain frequency.

Alternatively, the n light sources are evenly distributed on the circumference, and a polygon formed by the n light sources takes a vertical straight line passing through the center of the front mirror surface as a symmetry axis, wherein n is a natural number greater than or equal to 3;
wherein illumination angles of the n light sources and a distance between each light source and the center of the front mirror surface, when being designed, are determined according to a sensitive height and/or the sensitive distance of the object required to be sensed, in combination with an illumination cone of the light source and/or light transmittance of the lens, wherein the sensitive height is a height of the object required to be sensed, and the sensitive distance is a perpendicular distance from the object required to be sensed to a tangent line of an outer head-on edge of a projection of a mobile robot body on a bearing surface; wherein
selectively activating a light source among the n light sources, whose field of view corresponds to a space of the sensed object, according to a position and/or a height of the sensed object includes:
dividing the n light sources into m zones of light sources according to illumination position areas of the field of view, wherein m is a natural number greater than 1;
selectively activating the light source in the zone corresponding to the space of the sensed object according to the position and/or the height of the sensed object; and wherein
the control method further includes:
calibrating respectively images under illumination of each of the light sources to obtain calibration results of each of the light sources, and calibrating current image frame data acquired under illumination of each of the light sources using the calibration result.

Alternatively, dividing the n light sources into m zones of light sources according to illumination position areas of the field of view includes:
dividing the n light sources distributed on the circumference into m zones of light sources using m rays starting from the center of the front mirror surface.

Alternatively, m is 4, a first ray points to a left side of the vision machine in a horizontal direction of the front mirror surface, a second ray is perpendicular to the first ray, a third ray is perpendicular to the second ray, a fourth ray is perpendicular to the third ray, and the m zones include:
a first zone located between the fourth ray and the first ray,
a second zone located between the first ray and the second ray,
a third zone located between the second ray and the third ray, and
a fourth zone located between the third ray and the fourth ray; wherein
the light source in the first zone is used to illuminate an upper left side of a traveling direction of the vision machine, the light source in the second zone is used to illuminate a lower left side of the traveling direction of the vision machine, the light source in the third zone is used to illuminate a lower right side of the traveling direction of the vision machine, and the light source in the fourth zone is used to illuminate an upper right side of the traveling direction of the vision machine; and wherein
selectively activating the light source in the zone corresponding to the space of the sensed object according to the position and/or the height of the sensed object includes:
if the sensed object is located on a right side of the traveling direction of the vision machine, activating the light source in the third zone; determining whether the height of the sensed object is lower than the optical axis of the lens, and if so, activating the light source in the fourth zone to illuminate the upper surface of the sensed object;
if the sensed object is located on a left side of the traveling direction of the vision machine, activating the light source in the second zone; determining whether the height of the sensed object is lower than the optical axis of the lens, and if so, activating the light source in the first zone to illuminate the upper surface of the sensed object;
if the sensed object is located in the middle of the traveling direction of the vision machine, activating the light sources in the second zone and the third zone; determining whether the height of the sensed object is lower than the optical axis of the lens, and if so, activating the light sources in the first zone and the fourth zone to illuminate the upper surface of the sensed object;
if there are objects on the left side and the right side of the traveling direction of the vision machine at the same time, activating the light sources in the second zone and the third zone at the same time, or activating the light sources in the second zone and the third zone alternately in a time-division manner at a certain frequency; determining whether there is a sensed object whose height is lower than the optical axis of the lens, and if so, activating the light sources in the first zone and the fourth zone to illuminate the upper surface of the sensed object lower than the optical axis of the lens; or, if there are objects on the left side and the right side of the traveling direction of the vision machine at the same time, determining whether the sensitive distance of the object on the left side is smaller than that of the object on the right side, and if the sensitive distance of the object on the left side is smaller than that of the object on the right side, activating the light source in the second zone, determining whether the height of the sensed object on the left side is lower than the optical axis of the lens, and activating the light source in the first zone to illuminate the upper surface of the sensed object, if the height of the sensed object on the left side is lower than the optical axis of the lens;

if the sensitive distance of the object on the left side is greater than or equal to the sensitive distance of the object on the right side, activating the light source in the third zone, determining whether the height of the sensed object on the right side is lower than the optical axis of the lens, and if the height of the sensed object on the right side is lower than the optical axis of the lens, activating the light source in the fourth zone to illuminate the upper surface of the sensed object.

Alternatively, m is 4, the first ray points to the left side of the traveling direction of the vision machine at 45 degrees from the horizontal direction of the front mirror surface, the second ray is perpendicular to the first ray, the third ray is perpendicular to the second ray, and the fourth ray is perpendicular to the third ray, and the m zones includes:
  a first zone located between the fourth ray and the first ray,
  a fourth zone located between the first ray and the second ray,
  a second zone located between the second ray and the third ray, and
  a third zone located between the third ray and the fourth ray; wherein
  the light source in the first zone is used to illuminate an upper side of the traveling direction of the vision machine, the light source in the second zone is used to illuminate a lower side of the traveling direction of the vision machine, the light source in the third zone is used to illuminate the right side of the traveling direction of the vision machine, and the light source in the fourth zone is used to illuminate the left side of the traveling direction of the vision machine; and wherein
selectively activating the light source in the zone corresponding to the space of the sensed object according to the position and/or the height of the sensed object includes:
if the sensed object is located on the right side of the traveling direction of the vision machine, activating the light source in the third zone; determining whether the height of the sensed object is lower than the optical axis of the lens, and if so, activating the light source in the first zone to illuminate the upper surface of the sensed object;
if the sensed object is located on the left side of the traveling direction of the vision machine, activating the light source in the fourth zone; determining whether the height of the sensed object is lower than the optical axis of the lens, and if so, activating the light source in the first zone to illuminate the upper surface of the sensed object;
if the sensed object is located in the middle of the traveling direction of the vision machine, activating the light source in the second zone; determining whether the height of the sensed object is lower than the optical axis of the lens, and if so, activating the light source in the first zone to illuminate the upper surface of the sensed object;

if there are objects on the left side and the right side of the traveling direction of the vision machine at the same time, activating the light sources in the fourth zone and the third zone at the same time, or activating the light sources in the fourth zone and the third zone alternately in a time-division manner at a certain frequency; determining whether there is a sensed object whose height is lower than the optical axis of the lens, and if so, activating the light source in the first zone to illuminate the upper surface of the sensed object; or, if there are objects on the left side and the right side of the traveling direction of the vision machine at the same time, determining whether the sensitive distance of the object on the left side is smaller than that of the object on the right side, if the sensitive distance of the object on the left side is smaller than that of the object on the right side, activating the light source in the fourth zone, and if the sensitive distance of the object on the left side is greater than or equal to that of the object on the right side, activating the light source in the third zone; determining whether that height of the sensed object on the side with the light source being activated is lower than the optical axis of the lens, and if so, activating the light source in the first zone.

Alternatively, selectively activating the light source in the zone corresponding to the space of the sensed object according to the position and/or the height of the sensed object further includes deactivating the light source currently activated when activating the light source for illuminating the upper surface of the sensed object.

Alternatively, determining whether the height of the sensed object is lower than the optical axis of the lens includes determining whether an image pixel coordinate system contains, above a half of axis y, brightness information, and if so, determining that the height of the sensed object is higher than the optical axis of the lens, otherwise, determining that the height of the object is lower than the optical axis of the lens.

Alternatively, the n light sources are light sources of structured light having different patterns, the first light source is a light source of structured light having a first pattern, and the second light source is a light source of structured light having a second pattern.

Alternatively, calibrating respectively images under illumination of each of the light sources to obtain calibration results of each of the light sources includes:
  activating each of the light sources respectively to illuminate a target having a standard pattern, acquiring an image of the standard pattern under illumination of the light source activated, recording correspondence relationship between image frame data currently acquired and the light source activated, taking recorded image frame data as the calibration result that is under illumination of the light source activated, and saving the calibration result;
  wherein calibrating current image frame data acquired under illumination of each of the light sources using the calibration result includes,
  activating the light source, recording information of the light source currently activated, and collecting the current image frame data, searching the calibration result corresponding to the light source currently activated according to the information of the light source currently activated; and calibrating the current image frame data using a found calibration result.

A vision machine provided by the embodiment of the present disclosure includes a light source subsystem, wherein the light source subsystem includes n light sources distributed on a periphery of a front mirror surface of the vision machine; n is a natural number greater than or equal to 2; and a processor in the vision machine is configured to execute steps of the control method for light sources.

The embodiment of the present disclosure provides a method for controlling a movement of a mobile robot, which includes a vision machine, wherein the vision machine includes n light sources distributed on a periphery of a front mirror surface of the vision machine; n is a natural number greater than or equal to 2; the method includes the following steps:

activating the n light sources, and deactivating the n light sources when duration of activation of the n light sources reaches preset duration, and acquiring a first image in a traveling direction of the mobile robot during the activation of the n light sources;

analyzing the first image to obtain an initial position of an object in the traveling direction of the mobile robot;

activating a target light source corresponding to the initial position among the n light sources, and acquiring a second image in the traveling direction of the mobile robot during activation of the target light source;

analyzing the second image to obtain a target position of the object; and controlling a body of the mobile robot to move to avoid the object according to the target position.

The embodiment of the present disclosure provides a computer-readable storage medium, in which a computer program is stored, and when the computer program is executed by a processor, steps of the control method for light sources are implemented.

The embodiment of the present disclosure provides a computer program which, when runs on a computer, causes the computer to execute steps of the control method for light sources.

The present disclosure provides a control method and an apparatus for light sources of a vision machine, by arranging a plurality of light sources, the field of view of the vision machine is enlarged; by combining with the spatial information of the sensed object, the plurality of light sources may be controlled flexibly, and corresponding light illumination can be provided based on environmental requirements, which reduces the interference signal caused by reflection of a single light source. For the sensed object that is lower than the optical axis of the lens, the light illumination is provided to obtain the image of the upper surface of the sensed object, thereby obtaining the depth information of the sensed object, expanding the sensing range of the vision machine, improving the sensing ability, and enriching the application of the vision machine.

BRIEF DESCRIPTION OF THE DRAWINGS

FIG. 16a shows a calibrated image acquired under the illumination of a lower light source; FIG. 16b shows an image of an obstacle extracted based on FIG. 16a.

DETAILED DESCRIPTION

In order to make the purpose, technical means and advantages of the present disclosure clearer, the present disclosure will be further explained in detail below with reference to the accompanying drawings.

The embodiment of the present disclosure provides a vision machine including a light source subsystem. The light source subsystem includes n light sources distributed on the periphery of a front mirror surface of lens of the vision machine; herein n is a natural number greater than or equal to 2. At least two light sources are distributed around the lens of the vision machine, and the vision machine controls activation and deactivation of the light sources according to spatial information of sensed objects within the field of view of the vision machine, thereby expanding a range of the field of view of the vision machine. The sensed object is the object sensed by the lens.

Alternatively, the periphery of the front mirror surface may be a circumference having a first radius, and taking a center of the front mirror surface as a circle center. The first radius is at least larger than a radius of the front mirror surface of the vision machine.

In the embodiment of the present disclosure, the light source may include, but is not limited to, an infrared light source.

The following descriptions will take a vision machine applied to a mobile robot as an example. It should be understood that the embodiments of the present disclosure are not limited to this, but may be applied to any vision machine that needs to be illuminated by a light source to acquire image data.

Embodiment One

Figure 1:
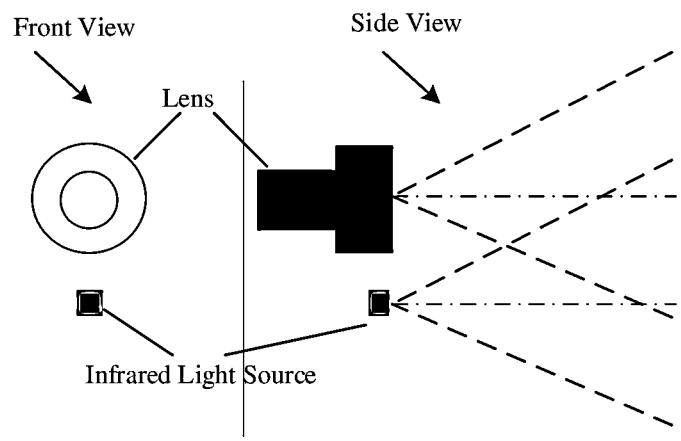
FIG. 1 is a schematic diagram of the positional relationship between the infrared light source and the lens.
Figure 2A:
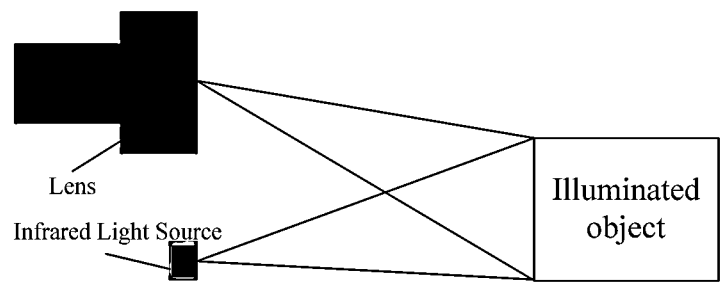
FIGS. 2a-2c are schematic diagrams of the influence of existing light source position on image acquisition during illumination.
Figure 2B:
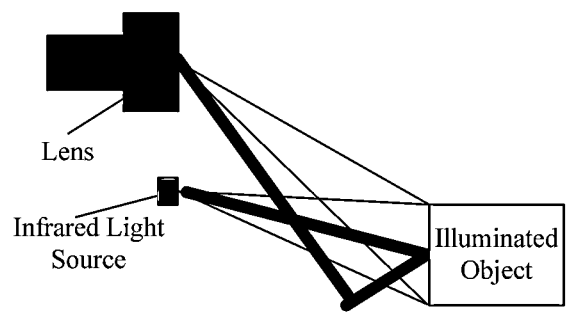
Figure 2C:
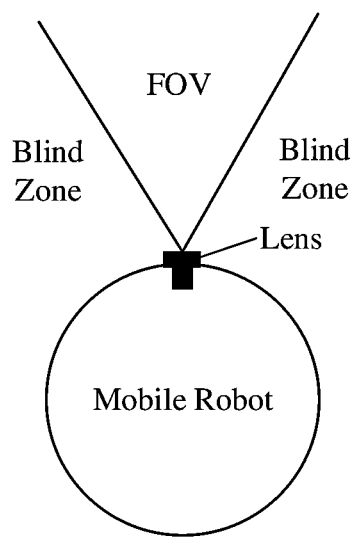
Figure 3:
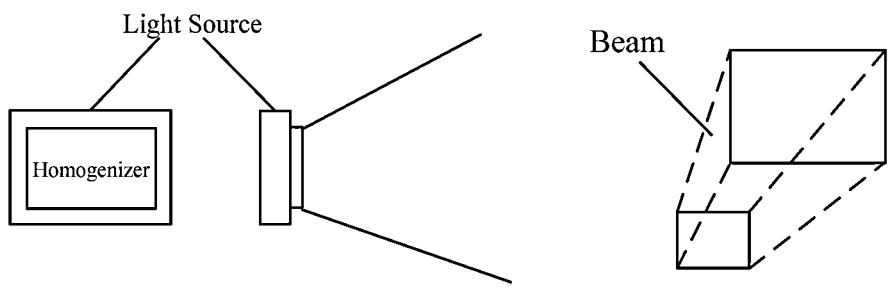
FIG. 3 is a schematic diagram of brightness difference when illuminated by a single light source.

The applicant found that the imaging brightness near the center of the image sensor is larger than that at the edge when illuminated by a single light source. As show in FIG. 3, it is a schematic diagram of brightness difference when illuminated by a single light source. For a TOF camera with a single light source, even if a surface of the light source is equipped with a homogenizer, the brightness of the emitted light will decrease with the increase of an angle between the emitted light and the axis of the light source. The light beam emitted by the light source is an illumination cone, and the brightness of each cone section of the illumination cone will also be different. As for the lens, which is composed of one or more lenses, the brightness of the incident light will change greatly after the incident light enters the lens from different directions because of the optical characteristics of the lens. For example, the brightness of the incident light entering from the edge of the lens will be greatly weakened. In addition, the light transmittance of the lens will decrease as the increase of the angle between the incident light and the optical axis, that is, the brightness of the object when it is imaged at the edge of the image will be much less than when it is imaged in the middle of the image. As a result, it is difficult to obtain the image of the object when it is imaged at the edge of the image, thus causing the object not to be easily sensed.

Figure 4A:
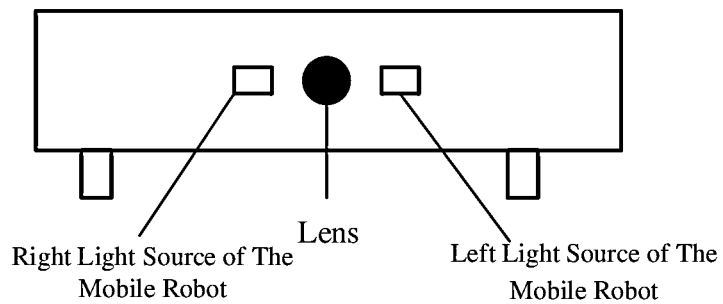
FIGS. 4a-4c are schematic diagrams of the layout of the light sources according to embodiment one.
Figure 4B:
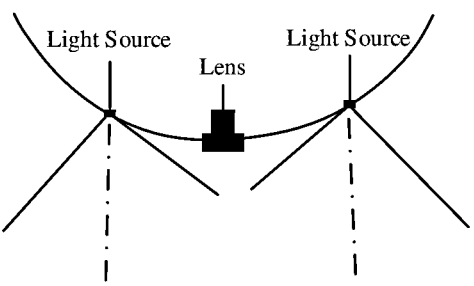
Figure 4C:
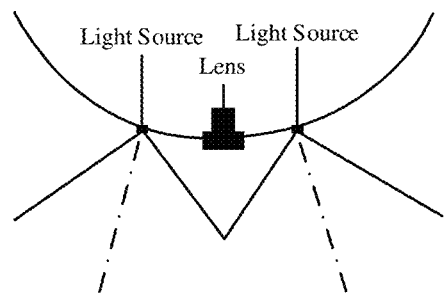

In view of this, in the embodiment of the present disclosure, two light sources are distributed in a width direction (i.e., horizontal direction) of the lens. Referring to FIGS. 4a to 4c, they are schematic diagrams of the layout of the light sources in embodiment one. As shown in FIG. 4a, the head-on view of the traveling direction of the mobile robot is taken as the main view, and two light sources are distributed on the left and the right sides of the lens in the horizontal direction. In order to obtain a good symmetrical light source, the two light sources are distributed symmetrically on the left and on the right, taking the lens as a symmetry center. As shown in FIG. 4b, which is the top view of FIG. 4a, the axes of the two light sources may be parallel to the optical axis of the lens. As shown in FIG. 4c, which is the top view of FIG. 4a, the axes of the two light sources may also be at certain angles with the optical axis of the lens. Alternatively, in order to decrease the range of the blind zone, an intersection of the axes of the two light sources is located in an opposite direction of the illumination direction of the light sources.

When using the scheme where left and right light sources are distributed, the attenuation characteristics of the light sources in all directions, the light transmittance of the lens, the FOV of the light source, the focal length of the lens and other factors may be taken into account in an overall design. The final design goal is to broaden the overall illumination range and enhance the uniformity of the brightness of the light emitted by the light source and the brightness of the incident light from the lens. Specifically, the perpendicular distance from the sensed object to the tangent line of the outer head-on edge of the projection of the body of the mobile robot on a bearing surface is taken as a sensitive distance, and the maximum distance between a center of the projection of the body of the mobile robot on the bearing surface and the outline of the sensed object is taken as a sensitive width. The illumination angle of the light source and the distance between the light source and the center of the front mirror surface may be adjusted according to the requirements of the sensitive distance and the sensitive width in combination with the illumination cone of the light source and the light transmittance of the lens.

The bearing surface is the plane where the front mirror surface of the lens is located. The sensitive distance may be understood as the maximum perpendicular distance from the sensed object to the bearing surface. The sensitive width may be understood as the maximum perpendicular distance from the sensed object to the optical axis of the lens. The illumination angle of the light source is an angle between the light beam illuminated by the light source to the object and the axis of the light source.

Figure 5A:
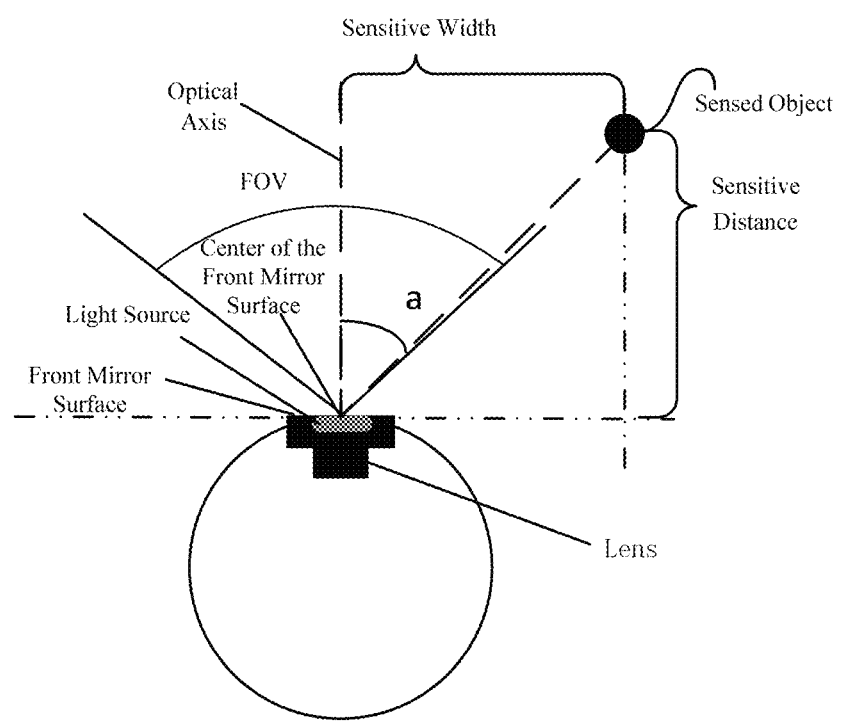
FIGS. 5a-5d are schematic diagrams of differences in FOV and sensitive distance of light sources with different positions and/or different angles.
Figure 5B:
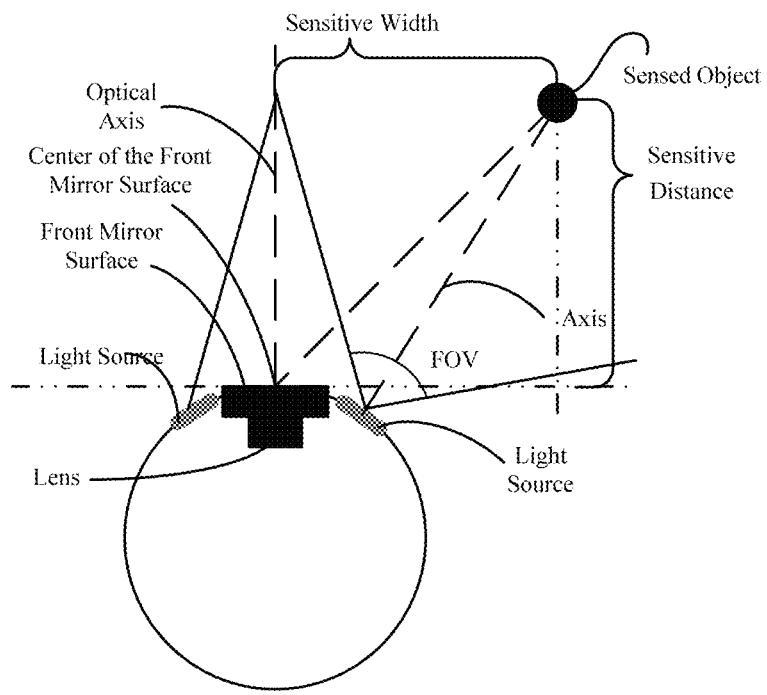
Figure 5C:
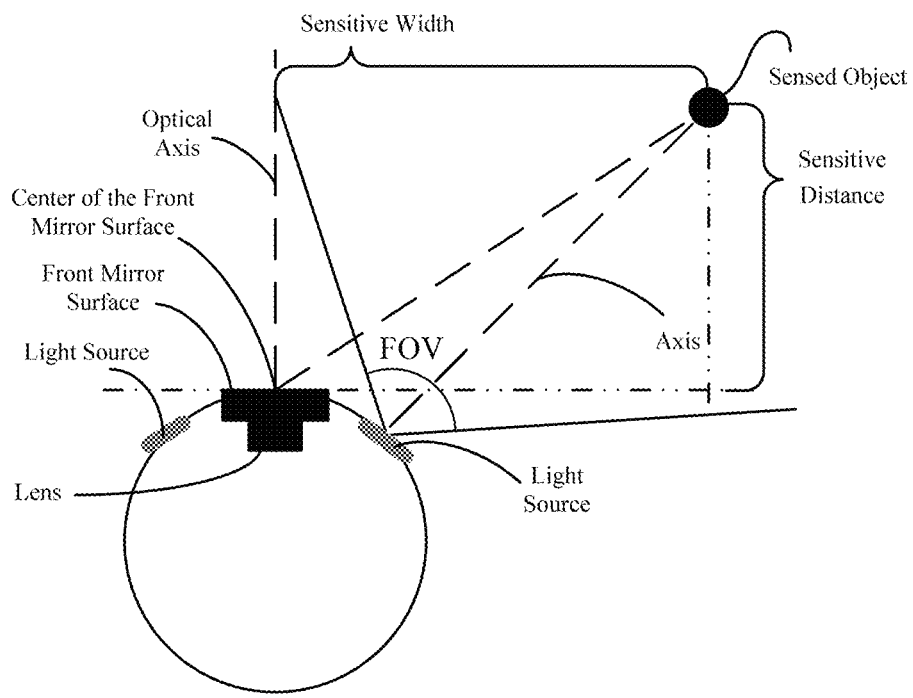

Referring to FIGS. 5a-5c, they are schematic diagrams of differences in FOV and sensitive distance of light sources with different positions and/or different illumination angles. As shown in FIG. 5a, a single light source illuminates the object by the light beam being at an angle a with the axis of the light source, and the angle a is not equal to 0. As shown in FIG. 5b, compared with FIG. 5a, for an object with the same sensitive distance, the right light source illuminates the object by the light beam being at 0-degree angle with the axis of the light source. Compared with FIG. 5a, the illumination angle of the light source in FIG. 5b is reduced and the brightness of the light illuminated by the light source on the object is improved.

As shown in FIG. 5c, compared with FIG. 5b, when the distance between the right light source and the center of the front mirror surface increases, for the object with the same sensitive distance, the angle between the incident light entering the lens and the optical axis of the lens increases even if the right light source still illuminates the object by the light beam being at 0-degree angle with the axis of the light source. Since the light transmittance of the lens will decreases as the angle between the incident light and the optical axis increases, the imaging brightness of the object at the edge of the image will be affected. Of course, compared with FIG. 5b, FIG. 5c may obtain a larger overall FOV of the light source, where the overall FOV of the light source is a sum of the FOVs of multiple light sources.

Figure 5D:
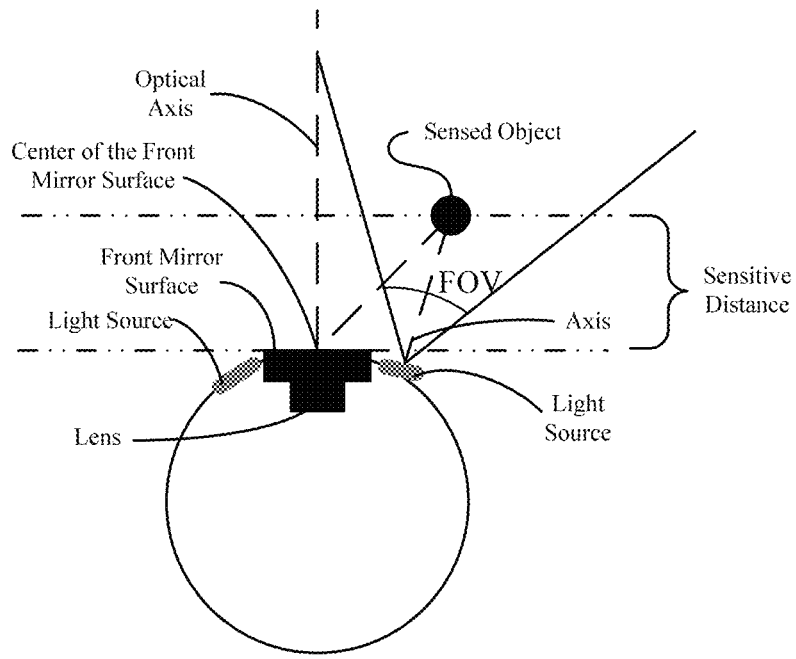

As shown in FIG. 5d, when the angle between the axis of the right light source in the same position as that in FIG. 5b and the optical axis of the lens decreases, the sensitive distance of the object sensed by the lens in the same optical path decreases.

This is because when the angle between the axis of the light source and the axis of the lens becomes smaller, the light beam will focus in the area in front of the lens, and the brightness of the object at the edge of the FOV of the lens will obviously decrease, which will cause the object at the edge of the FOV of the lens not to be easily found under the same brightness threshold, thus leading to the reduction of the sensitive distance.

As for the FOV of the light source, it can be seen from the above FIGS. 5a-5d that, when the distance between the light source and the center of the front mirror surface increases, the overall FOV of the light source will increase, and when the angle between the axis of the light source and the optical axis of the lens increases, the sensitive distance of the object sensed by the lens will increase accordingly.

The sensitive width is the same as the change in the angle of the FOV of the light source.

Figure 6:
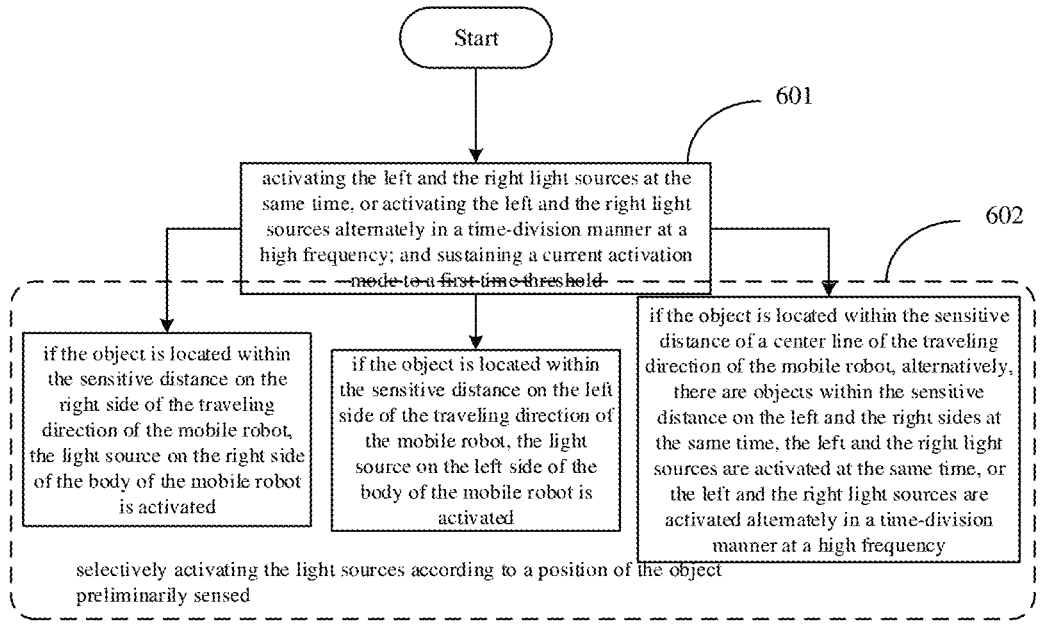
FIG. 6 is a flow chart of controlling of the light sources according to embodiment one.

Referring to FIG. 6, it is a flow chart of a control method for light sources of a vision machine provided based on embodiment one. The control method for light sources includes the following steps.

Step 601, initially, activating the left and the right light sources at the same time, or activating the left and the right light sources alternately in a time-division manner at a high frequency; and sustaining a current activation mode to a first time threshold, so that the mobile robot may preliminarily determine an overall situation of the object in the field of view in the traveling direction.

In this step, there are two activation modes of the light sources, the first activation mode is to activate the left and the right light sources at the same time, and the second activation mode is to activate the left and the right light sources alternately in a time-division manner at a high frequency.

Initially, the vision machine may adopt the first activation mode to activate the left and the right light sources at the same time, and when the duration of the first activation mode reaches the first time threshold, step 602 is executed.

Initially, the vision machine may also activate the left and the right light sources alternately in a time-division manner at a high frequency, and when the duration of the second activation mode reaches the first time threshold, step 602 is executed.

In this step, the vision machine maintains the first activation mode or the second activation mode for a period of time, so that it is convenient for the vision machine to determine the overall situation of the object within the field of view of the vision machine, that is, the position of the object is preliminarily sensed. The frequency at which the left and the right light sources are activated alternately in a time-division manner may be set according to the actual requirements, or a default frequency may be adopted, which is not limited herein.

Step 602, selectively activating the light sources according to a position of the object preliminarily sensed.

In this step, according to the position of the object preliminarily sensed, the light source whose field angle corresponds to the space of the sensed object is selectively activated.

For example, if the object is located within the sensitive distance on the right side of the traveling direction of the mobile robot, the light source on the right side of the body of the mobile robot is activated; if the object is located within the sensitive distance on the left side of the traveling direction of the mobile robot, the light source on the left side of the body of the mobile robot is activated; if the object is located within the sensitive distance of a center line of the traveling direction of the mobile robot, alternatively, there are objects within the sensitive distance on the left and the right sides at the same time, the left and the right light sources are activated at the same time, or the left and the right light sources are activated alternately in a time-division manner at a high frequency. The sensitive distance of the center line is the sensitive distance on the optical axis of the lens.

In the embodiment of the present disclosure, when a switching frequency of the left and the right light sources is high enough or the left and the right light sources are activated at the same time, the overall FOV of the light sources is much larger than that of a single light source. The embodiment of the present disclosure can obtain image data of objects farther away, and can also obtain the image data of objects in a wider range. The light source at the corresponding position is used for illumination according to the position of the object, which not only saves the power, but also improves the brightness of the light beam illuminated by the light source onto the object, thus improving the quality of the image acquired.

Embodiment Two

Figure 7A:
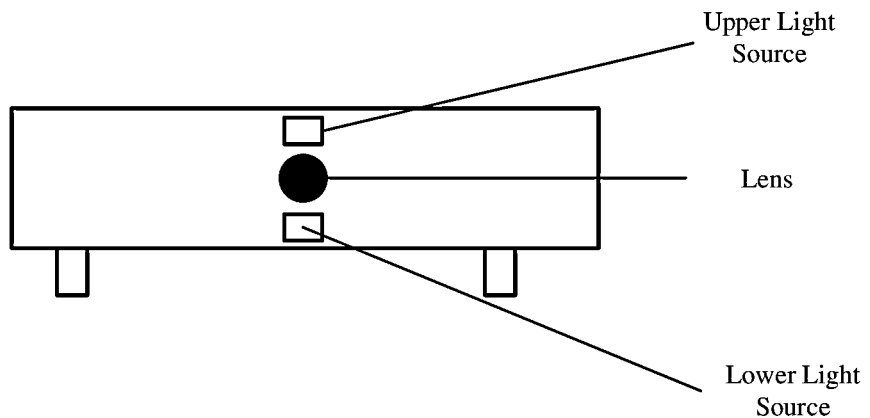
FIGS. 7a-7d are schematic diagrams of the layout of the light sources according to embodiment two.
Figure 7B:
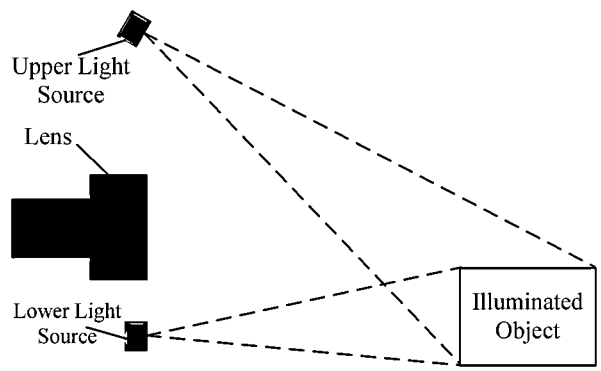
Figure 7C:
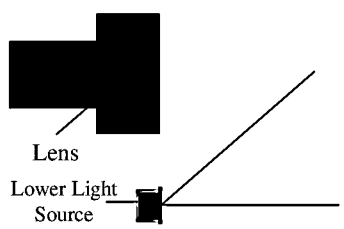
Figure 7D:
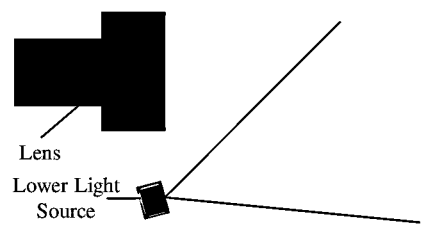

Referring to FIGS. 7a to 7d, they are schematic diagrams of the layout of the light sources in embodiment two. As shown in FIGS. 7a to 7d, two light sources are distributed in a height direction (vertical direction) of the lens. As shown in FIG. 7a, the head-on view of the traveling direction of the mobile robot is taken as the main view, and two light sources are distributed on the upper and the lower sides of the lens in the vertical direction. Alternatively, the centers of the two light sources are on the same line as the center of the front mirror surface. Alternatively, as shown in FIG. 7b, an axis of the lower light source is parallel to the optical axis of the lens, so as to illuminate the object on the bearing surface side of the mobile robot. Alternatively, as shown in FIG. 7c, the lower light source is installed with a homogenizer which enables the emitted light to be emitted at an elevation angle relative to the optical axis of the lens, to increase the illumination brightness for the object on the bearing surface side of the mobile robot. The upper light source emits light at a depression angle relative to the optical axis of the lens, that is, an axis of the upper light source and the optical axis of the lens has an included angle of less than 90 degrees, and an intersection of the axis of the upper light source and the optical axis of the lens is located in the illumination direction of the upper light source, to illuminate an upper surface of the object with a certain height. Alternatively, as shown in FIG. 7d, the lower light source may also emit light at an elevation angle relative to the optical axis of the lens, that is, an axis of the lower light source and the optical axis of the lens has an included angle of less than 90 degrees, and an intersection of the axis of the lower light source and the optical axis of the lens is located in the illumination direction of the lower light source.

The distance between the upper light source and the center of the front mirror surface may be different from the distance between the lower light source and the center of the front mirror surface. For example, in order to obtain a surface image of a higher object, the distance between the upper light source and the center of the front mirror surface is larger than that between the lower light source and the center of the front mirror surface.

When using scheme where the upper and lower light sources are distributed, the attenuation characteristics of light sources in all directions, the light transmittance of the lens, the focal length of the lens and other factors may be taken into account in an overall design. The final design goal is to broaden the overall illumination range and enhance the uniformity of the brightness of the light emitted by the light source and the brightness of the incident light from the lens. Specifically, taking a height of the sensed object as a sensitive height, the illumination angle of the light source and the distance between the light source and the center of the front mirror surface may be adjusted according to the requirements of the sensitive distance and the sensitive height in combination with the illumination cone of the light source and the light transmittance of the lens. According to the principle of light path, the sensitive height and the sensitive distance of the sensed object increase as the distance between the upper light source and the center of the front mirror surface increases, and decrease as the depression angle of the upper light source increases, the sensitive distance of the sensed object increases as the distance between the lower light source and the center of the front mirror surface decreases, and increases as the elevation angle of the lower light source increases.

Figure 8:
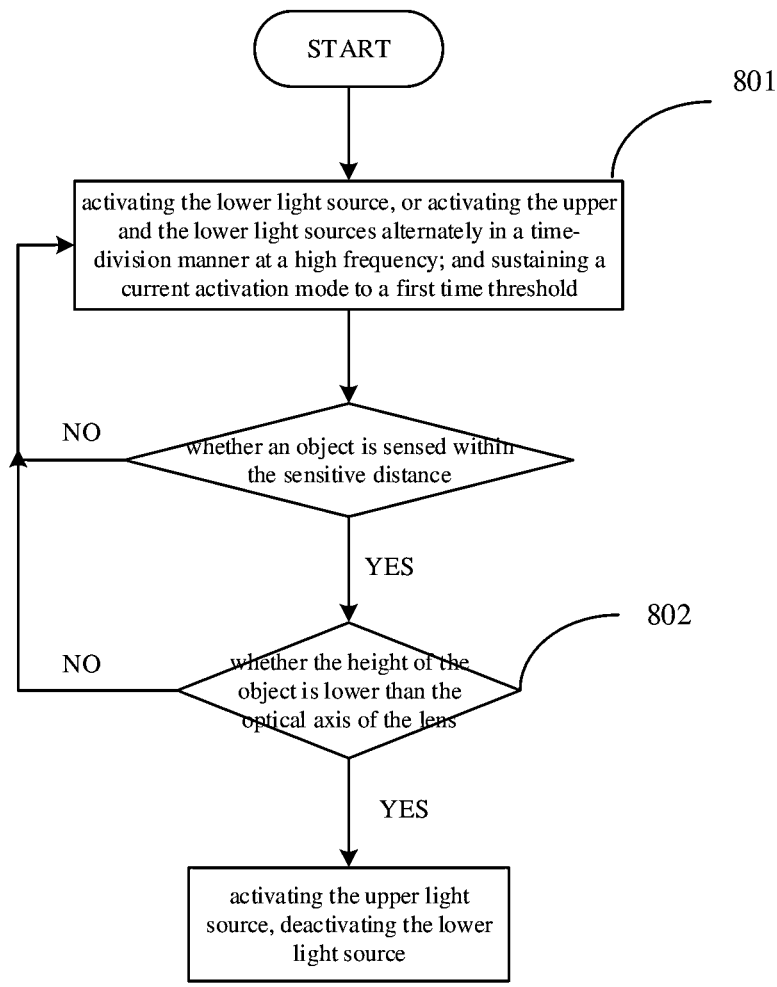
FIG. 8 is a flow chart of controlling of the light sources according to embodiment two.

Referring to FIG. 8, it is a flow chart of a control method for light sources of a vision machine provided based on embodiment two. The control method for light sources includes the following steps.

Step 801, initially, activating the lower light source, or activating the upper and the lower light sources alternately in a time-division manner at a high frequency; and sustaining a current activation mode to a first time threshold, to illuminate the traveling direction of the mobile robot, so as to acquire the image of the object.

In this step, there are two activation modes of the light sources, the first activation mode is to activate the lower light source, and the second activation mode is to activate the upper and the lower light sources alternately in a time-division manner at a high frequency.

Initially, the vision machine may adopt the first activation mode to activate the lower light source; and when the duration of the first activation mode reaches the first time threshold, step 802 is executed.

Initially, the vision machine may also activate the upper and the lower light sources alternately in a time-division manner at a high frequency, and when the duration of the second activation mode reaches the first time threshold, step 802 is executed.

In this step, the vision machine maintains the first activation mode or the second activation mode for a period of time, so that it is convenient to obtain the image of the object in the traveling direction of the mobile robot. The frequency at which the upper and the lower light sources are activated alternately in a time-division manner may be set according to actual requirements, or a default frequency may be adopted, which is not limited herein.

Step 802, determining, when an object is sensed within the sensitive distance, whether a height of the object is lower than an optical axis of the lens, and if the height of the object is lower than the optical axis of the lens, activating the upper light source to illuminate an upper surface of the object, so that the vision machine may acquire the image of the upper surface of the object. Compared with the vision machine with a single light source, the vision machine installed with the upper and lower light sources may obtain a depth value of the object in this way. Alternatively, the vision machine will deactivate the lower light source when it is determined that the height of the object is lower than the optical axis of the lens, to reduce power consumption. Otherwise, the upper light source is not activated, and the process returns to step 801.

Herein, the depth value of the object is the width of the object in the direction parallel to the optical axis of the lens. In the embodiment of the present disclosure, the image of the upper surface of the object may be acquired, thus the depth value of the object may be obtained.

In this step, the vision machine determines whether there is a sensed object, that is, whether there is an object within the sensitive distance. If no object is sensed within the sensitive distance, the process returns to step 801. If an object is sensed within the sensitive distance, the vision machine determines whether the height of the sensed object is lower than the optical axis of the lens. If the height of the sensed object is lower than the optical axis of the lens, the upper light source is activated. To reduce power consumption, the vision machine deactivates the lower light source while activating the upper light source. If the height of the sensed object is higher than or equal to the optical axis of the lens, the upper light source is not activated, and the process returns to step 801.

When determining whether the height of the object is lower than the optical axis of the lens, it may be determined based on whether the image pixel coordinate system contains, above a half of axis y, brightness information. If the image pixel coordinate system contains, above a half of axis y, brightness information, it is determined that the height of the object is higher than or equal to the optical axis of the lens; otherwise, it is determined that the height of the object is lower than the optical axis of the lens.

In this step, the duration of activation of the upper light source may be set as required. For example, the duration of activation of the upper light source is set as a second time threshold, that is, the vision machine deactivates the upper light source after the duration of activation of the upper light source reaches the second time threshold. The vision machine activates the lower light source while the upper light source is deactivated.

In the embodiment of the present disclosure, the overall FOV of the light sources is much larger than that of a single light source. The embodiment of the present disclosure can obtain image data of objects farther away, which is beneficial to improving the image quality. By using the upper light source, the upper surface of the object with a certain height may be illuminated, so that the image acquisition subsystem may obtain the image of the upper surface of the object, thus obtaining the depth value of the object, which is beneficial for mobile robots to avoid obstacles. For example, after detecting an obstacle, the mobile robot may bypass the obstacle according to the depth value.

Embodiment Three

Embodiment three is a combination of embodiment one and embodiment two.

Figure 9:
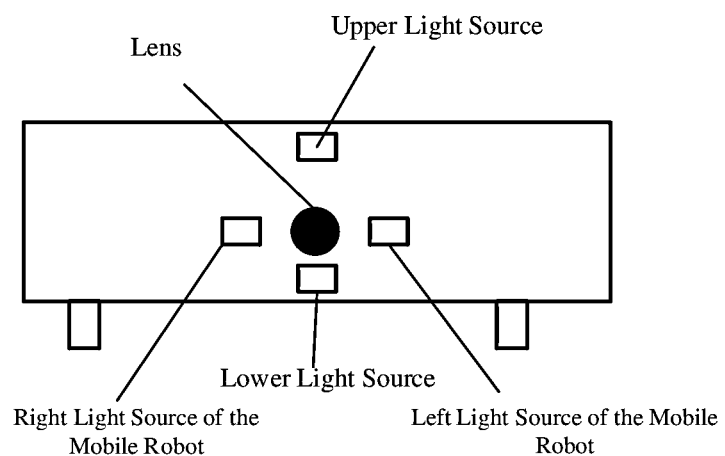
FIG. 9 is a schematic diagram of 4 light sources distributed around a lens.

Referring to FIG. 9, it is a schematic diagram of the layout of the light sources in embodiment three. As shown in FIG. 9, 4 light sources are distributed around the lens. The head-on view of the traveling direction of the mobile robot is taken as the main view, two light sources are respectively distributed on the left and the right sides of the lens in the horizontal direction, and in order to obtain a good symmetrical light source, the two light sources are distributed symmetrically on the left and on the right, taking the lens as a symmetry center. Two light sources are respectively distributed on the upper and the lower sides of the lens in the vertical direction. Alternatively, the centers of the two light sources are on the same line as the center of the front mirror surface.

The distance between the left and right light sources and the center of the front mirror surface may be different from or the same as the distance between the upper and lower light sources and the center of the front mirror surface. For example, the distance between the left and right light sources and the center of the front mirror surface is a first distance, the distance between the upper light source and the center of the front mirror surface is a second distance, and the distance between the lower light source and the center of the front mirror surface is a third distance. The distances may be: the first distance≥the second distance≥the third distance, in this way, not only a large FOV of the light source of the vision machine may be obtained by using the left and right light sources, but also a higher object may be illuminated by the upper light source.

The illumination angle of each light source and the distance between the light source and the center of the front mirror surface may be selected and adjusted according to the requirements of the sensitive distance, the sensitive height and the sensitive width in combination with the illumination cone of the light source and the light transmittance of the lens.

Figure 10:
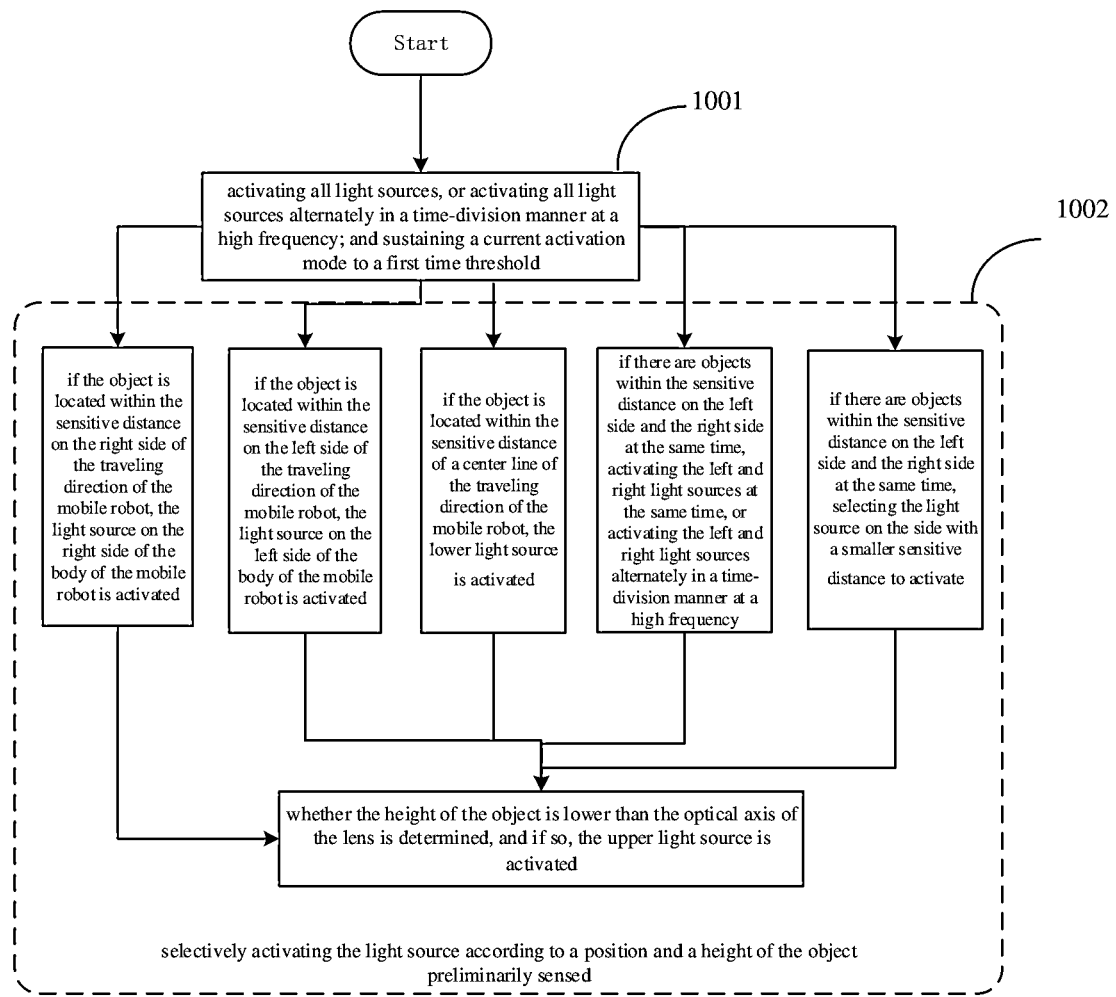
FIG. 10 is a flow chart of controlling of the light sources according to embodiment three.

Referring to FIG. 10, it is a flow chart of a control method for light sources of a vision machine provided based on embodiment three. The control method for light sources includes the following steps.

Step 1001, activating all light sources, or activating all light sources alternately in a time-division manner at a high frequency; and sustaining a current activation mode to a first time threshold, so that the mobile robot may preliminarily determine an overall situation of the object in the field of view in the traveling direction.

Step 1002, selectively activating the light source according to a position and a height of the object preliminarily sensed.

For example, if the object is located within the sensitive distance on the right side of the traveling direction of the mobile robot, the light source on the right side of the body of the mobile robot is activated; whether the height of the object is lower than the optical axis of the lens is determined, and if the height of the object is lower than the optical axis of the lens, the upper light source is activated to illuminate the upper surface of the object, so that the vision machine may acquire the image of the upper surface of the object. Alternatively, the vision machine may deactivate the right light source when activating the upper light source, to reduce power consumption.

If the object is located within the sensitive distance on the left side of the traveling direction of the mobile robot, the light source on the left side of the body of the mobile robot is activated; whether the height of the object is lower than the optical axis of the lens is determined, and if the height of the object is lower than the optical axis of the lens, the upper light source is activated to illuminate the upper surface of the object, so that the vision machine may acquire the image of the upper surface of the object. Alternatively, the vision machine may deactivate the left light source when activating the upper light source, to reduce power consumption.

If the object is located within the sensitive distance of a center line of the traveling direction of the mobile robot, the lower light source is activated; whether the height of the object is lower than the optical axis of the lens is determined, and if the height of the object is lower than the optical axis of the lens, the upper light source is activated to illuminate the upper surface of the object, so that the vision machine may acquire the image of the upper surface of the object. Alternatively, the vision machine may deactivate the lower light source when activating the upper light source, to reduce power consumption.

If there are objects within the sensitive distance on the left side and the right side at the same time:

one implementation is to activate the left and right light sources at the same time, or to activate the left and right light sources alternately in a time-division manner at a high frequency; to determine whether the height of any object is lower than the optical axis of the lens, and if the height of the object is lower than the optical axis of the lens, to activate the upper light source to illuminate the upper surface of the object that is lower than the optical axis of the lens, so that the vision machine may obtain the image of the upper surface of the object. Alternatively, the vision machine may deactivate the left and right light sources when activating the upper light source, to reduce power consumption.

Another implementation is to determine which is smaller, the sensitive distance of the object located on the left side or the sensitive distance of the object located on the right side, and to select the light source on the side with a smaller sensitive distance to activate; to determine whether the height of the object on the side with the smaller sensitive distance is lower than the optical axis of the lens, and if the height of the object on the side with the small sensitive distance is lower than the optical axis of the lens, to activate the upper light source. Alternatively, the vision machine may deactivate the light source on the side with the smaller sensitive distance when activating the upper light source, to reduce power consumption.

The duration of activation of the upper light source may be set as required. For example, the duration of activation of the upper light source is set as a second visual threshold. While the upper light source is deactivated, the vision machine again activates the light source that was on before the upper light source is activated.

In the embodiment of the present disclosure, by arranging the light sources around the lens, up and down, left and right, the flexibility of illumination and the adaptability to illumination requirements are further improved, and the FOV of the light source is improved from multiple perspectives, which is beneficial for the improvement of image acquisition quality.

Embodiment Four

Referring to FIGS. 11a to 11d, FIG. 11a is a schematic diagram of n light sources distributed around the lens. The head-on view of the traveling direction of the mobile robot is taken as the main view, and n light sources are distributed around the lens. In order to distinguish from embodiment one or two, n is a natural number greater than or equal to 3 in the present embodiment. Alternatively, n light sources are evenly distributed on a circumference having a first radius that is larger than the radius of the lens, and taking the center of the front mirror surface as a circle center.

Figure 11A:
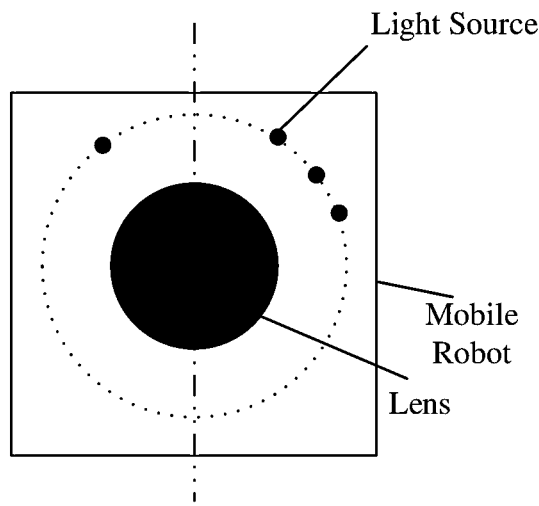
FIGS. 11a-11d are schematic diagrams of n light sources distributed around a lens.
Figure 11B:
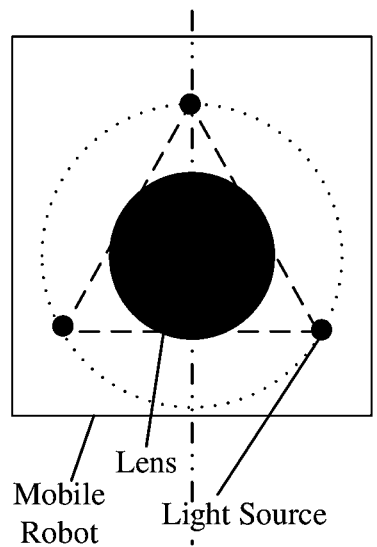
Figure 11C:
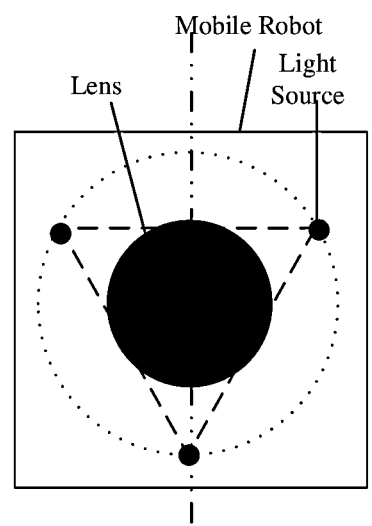
Figure 11D:
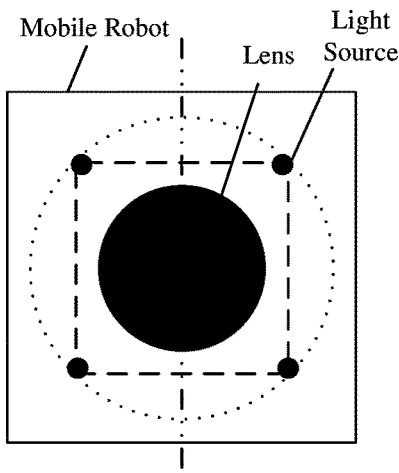

Alternatively, a polygon formed by sequentially connecting the light sources takes a vertical straight line passing through the center of the front mirror surface as a symmetry axis. For example, FIG. 11b is a schematic diagram of a layout of the light sources when n is 3, FIG. 11c is a schematic diagram of another layout of the light sources when n is 3, and FIG. 11d is a schematic diagram of a layout of the light sources when n is 4.

It should be understood that the illumination angle of each light source and the distance between the light source and the center of the front mirror surface may be selected and adjusted according to the requirements of the sensitive distance, the sensitive height and the sensitive width in combination with the illumination cone of the light source and the light transmittance of the lens.

Figure 12A:
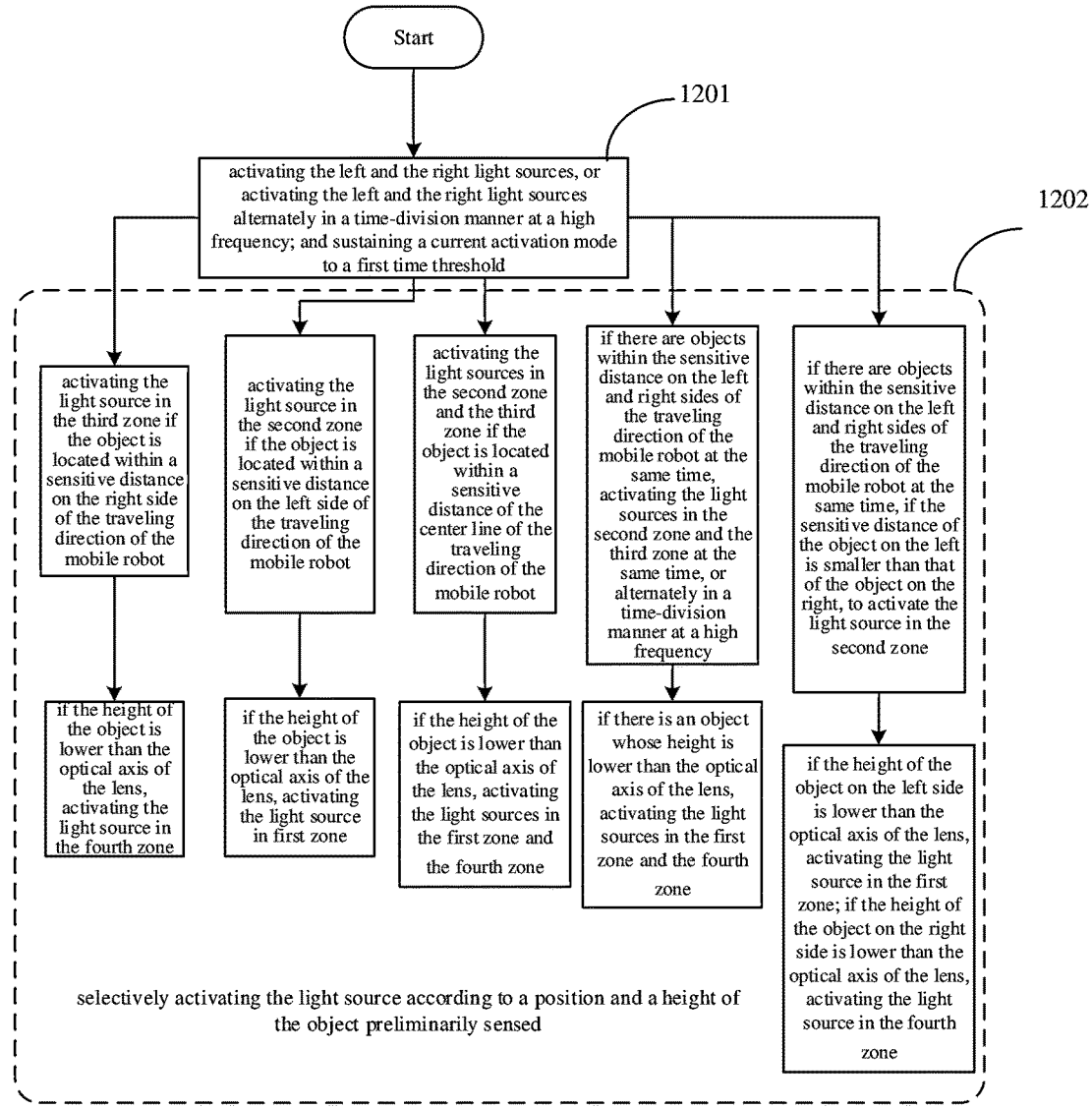
FIGS. 12a-12b are flow charts of controlling of the light sources according to embodiment three.
Figure 12B:
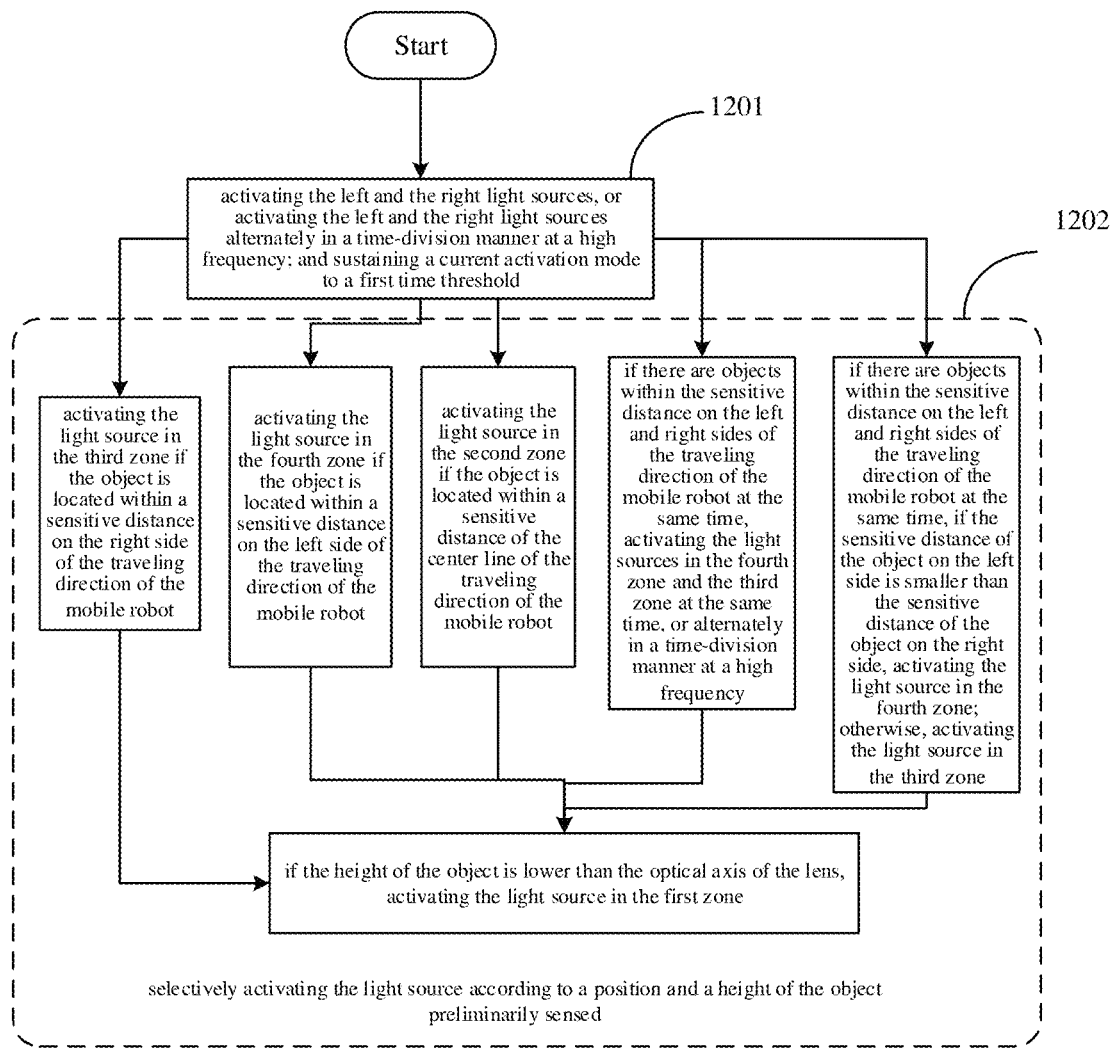

Referring to FIGS. 12a to 12b, they are flow charts of controlling of the light sources in embodiment three. The method includes the following steps.

Step 1201, activating the left and the right light sources, or activating the left and the right light sources alternately in a time-division manner at a high frequency; and sustaining a current activation mode to a first time threshold, so that the mobile robot may preliminarily determine an overall situation of the object in the field of view in the traveling direction.

Step 1202, selectively activating the light source according to a position and a height of the object preliminarily sensed.

Specifically, n light sources are firstly divided into m zones according to the illumination position area of the field of view. For example, n light sources distributed around the lens are divided into m zones of light sources by using m rays starting from the center of the front mirror surface, where m is a natural number greater than 1. Herein, the number of light sources included in each zone may be the same or different, which may be determined according to the illumination requirements.

The light source in the zone corresponding to a space of the sensed object is then selectively activated according to the position and the height of the sensed object. In the following, that n light sources being divided into 4 zones of light sources is taken as an example.

Figure 13A:
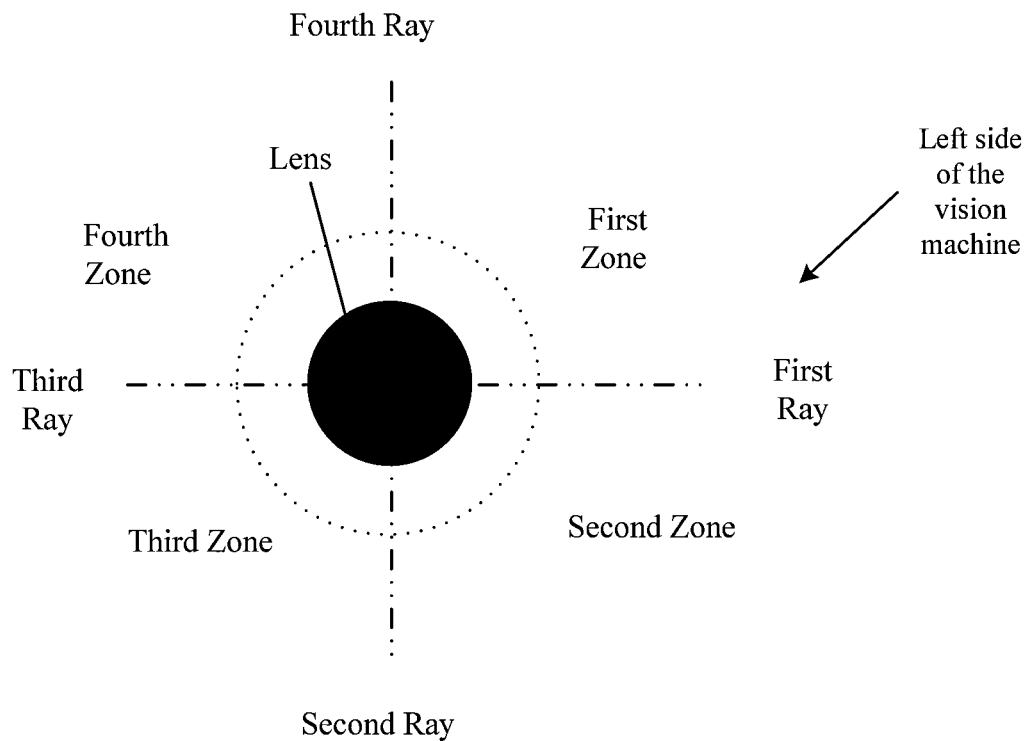
FIGS. 13a-13b are schematic diagrams of dividing n light sources into different zones.

One implementation is shown in FIG. 13a, a first ray starting from the center of the front mirror surface points to the left side of the vision machine in the horizontal direction of the front mirror surface, a second ray starting from the center of the front mirror surface points to the lower side of the vision machine in the vertical direction of the front mirror surface, a third ray starting from the center of the front mirror surface points to the right side of the vision machine in the horizontal direction of the front mirror surface, and the third ray starting from the center of the front mirror surface points to the upper side of the vision machine in the vertical direction of the front mirror surface. The second ray is perpendicular to the first ray, the third ray is perpendicular to the second ray, and the fourth ray is perpendicular to the third ray. The above 4 zones may include a first zone located between the fourth ray and the first ray, a second zone located between the first ray and the second ray, a third zone located between the second ray and the third ray, and a fourth zone located between the third ray and the fourth ray.

The light source in the first zone is used to illuminate an upper left side of the traveling direction (viewing angle field) of the mobile robot, the light source in the second zone is used to illuminate the lower left side of the traveling direction of the mobile robot, the light source in the third zone is used to illuminate the lower right side of the traveling direction of the mobile robot, and the light source in the fourth zone is used to illuminate the upper right side of the traveling direction of the mobile robot.

Based on this, step 1202 shown in FIG. 12a includes: activating the light source in the third zone if the object is located within a sensitive distance on the right side of the traveling direction of the mobile robot; determining whether the height of the object is lower than the optical axis of the lens, and if the height of the object is lower than the optical axis of the lens, activating the light source in the fourth zone to illuminate the upper surface of the object, so that the vision machine may acquire the image of the upper surface of the object. Alternatively, when the light source in the fourth zone is activated, the vision machine may deactivate the light source in the third zone to reduce the power consumption;

activating the light source in the second zone if the object is located within a sensitive distance on the left side of the traveling direction of the mobile robot; determining whether the height of the object is lower than the optical axis of the lens, and if the height of the object is lower than the optical axis of the lens, activating the light source in first zone to illuminate the upper surface of the object, so that the vision machine may acquire the image of the upper surface of the object. Alternatively, when the light source in the first zone is activated, the vision machine may deactivate the light source in the second zone to reduce the power consumption;

activating the light sources in the second zone and the third zone if the object is located within a sensitive distance of the center line of the traveling direction of the mobile robot; determining whether the height of the object is lower than the optical axis of the lens, and if the height of the object is lower than the optical axis of the lens, activating the light sources in the first zone and the fourth zone to illuminate the upper surface of the object, so that the vision machine may acquire the image of the upper surface of the object. Alternatively, when the light sources in the first zone and the fourth zone are activated, the vision machine may deactivate the light sources in the second zone and the third zone to reduce the power consumption.

If there are objects within the sensitive distance on the left and right sides of the traveling direction of the mobile robot at the same time:

one implementation is to activate the light sources in the second zone and the third zone at the same time, or to activate the light sources in the second zone and the third zone alternately in a time-division manner at a high frequency; to determine whether there is an object whose height is lower than the optical axis of the lens, and if there is an object whose height is lower than the optical axis of the lens, to activate the light sources in the first zone and the fourth zone to illuminate the upper surface of the object that is lower than the optical axis of the lens, so that the vision machine may acquire the image of the upper surface of the object. Alternatively, when the light sources in the first zone and the fourth zone are activated, the vision machine may deactivate the light sources in the second zone and the third zone to reduce the power consumption.

Another implementation is to determine whether the sensitive distance of the object on the left is smaller than that of the object on the right; if the sensitive distance of the object on the left is smaller than that of the object on the right, to activate the light source in the second zone, and to determine whether the height of the object on the side is lower than the optical axis of the lens; if the height of the object on this side is lower than the optical axis of the lens, to activate the light source in the first zone; if the height of the object on this side is higher than or equal to the optical axis of the lens, not to activate the first zone; if the sensitive distance of the object on the left side is greater than or equal to the sensitive distance of the object on the right side, to activate the light source in the third zone, and to determine whether the height of the object on the side is lower than the optical axis of the lens; if the height of the object on this side is lower than the optical axis of the lens, to activate the light source in the fourth zone; if the height of the object on this side is higher than or equal to the optical axis of the lens, not to activate the fourth zone. Alternatively, when the light source in the first zone is activated, the vision machine may deactivate the light source in the second zone, and when the light source in the fourth zone is activated, the vision machine may deactivate the light source in the third zone to reduce power consumption.

Figure 13B:
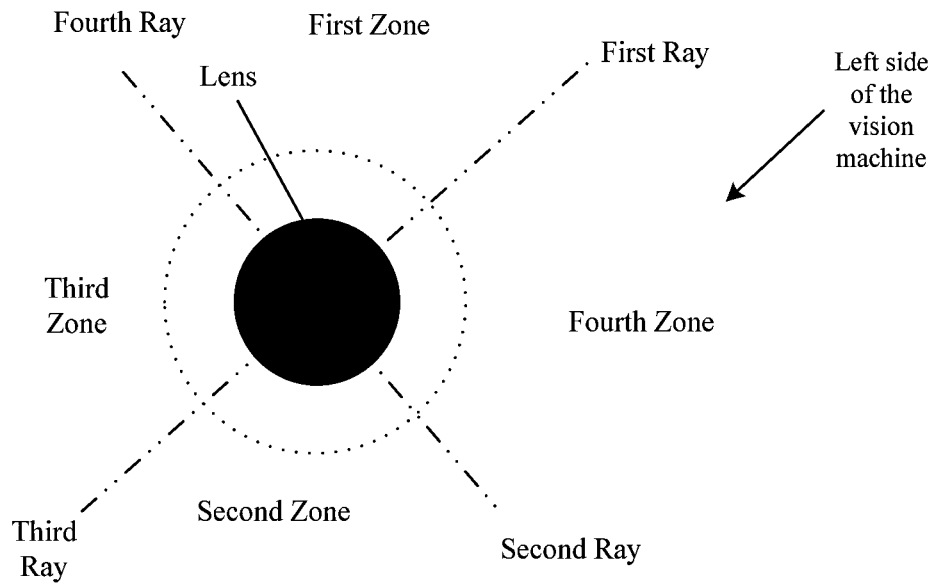

Taking that n light sources being divided into 4 zones of light sources as an example, another implementation is as shown in FIG. 13b. The first ray points to the left side of the vision machine at 45 degrees from the horizontal direction of the front mirror surface, the second ray points to the left side of the vision machine at −45 degrees from the horizontal direction of the front mirror surface, the third ray points to the right side of the vision machine at −45 degrees from the horizontal direction of the front mirror surface, and the fourth ray points to the right side of the vision machine at 45 degrees from the horizontal direction of the front mirror surface. The second ray is perpendicular to the first ray, the third ray is perpendicular to the second ray, and the fourth ray is perpendicular to the third ray. The above 4 zones may include a first zone located between the fourth ray and the first ray, a fourth zone located between the first ray and the second ray, a second zone located between the second ray and the third ray, and a third zone located between the third ray and the fourth ray.

The light source in the first zone is used to illuminate the upper side of the traveling direction of the mobile robot, the light source in the second zone is used to illuminate the lower side of the traveling direction of the mobile robot, the light source in the third zone is used to illuminate the right side of the traveling direction of the mobile robot, and the light source in the fourth zone is used to illuminate the left side of the traveling direction of the mobile robot.

Based on this, step 1202 shown in FIG. 12b includes: activating the light source in the third zone if the object is located within a sensitive distance on the right side of the traveling direction of the mobile robot; determining whether the height of the object is lower than the optical axis of the lens, and if the height of the object is lower than the optical axis of the lens, activating the light source in the first zone to illuminate the upper surface of the object, so that the vision machine may acquire the image of the upper surface of the object. Alternatively, when the light source in the first zone is activated, the vision machine may deactivate the light source in the third zone to reduce the power consumption;

activating the light source in the fourth zone if the object is located within a sensitive distance on the left side of the traveling direction of the mobile robot; determining whether the height of the object is lower than the optical axis of the lens, and if the height of the object is lower than the optical axis of the lens, activating the light source in the first zone to illuminate the upper surface of the object, so that the vision machine may acquire the image of the upper surface of the object. Alternatively, when the light source in the first zone is activated, the vision machine may deactivate the light source in the fourth zone to reduce the power consumption;

activating the light source in the second zone if the object is located within a sensitive distance of the center line of the traveling direction of the mobile robot; determining whether the height of the object is lower than the optical axis of the lens, and if the height of the object is lower than the optical axis of the lens, activating the light source in the first zone to illuminate the upper surface of the object, so that the vision machine may acquire the image of the upper surface of the object. Alternatively, when the light source in the first zone is activated, the vision machine may deactivate the light source in the second zone to reduce the power consumption.

If there are objects within the sensitive distance on the left and right sides of the traveling direction of the mobile robot at the same time:

one implementation is to activate the light sources in the fourth zone and the third zone at the same time, or activating the light sources in the fourth zone and the third zone alternately in a time-division manner at a high frequency; to determine whether there is an object whose height is lower than the optical axis of the lens, and if there is a sensed object whose height is lower than the optical axis of the lens, to activate the light source in the first zone to illuminate the upper surface of the object that is lower than the optical axis of the lens, so that the vision machine may acquire the image of the upper surface of the object. Alternatively, when the light source in the first zone is activated, the vision machine may deactivate the light sources in the fourth zone and the third zone to reduce the power consumption.

Another implementation is to determine whether the current sensitive distance of the object on the left side is smaller than the sensitive distance of the object on the right side; if the sensitive distance of the object on the left side is smaller than the sensitive distance of the object on the right side, to activate the light source in the fourth zone; otherwise, to activate the light source in the third zone; and to determine whether the height of the object on the side is lower than the optical axis of the lens; if the height of the object on this side is lower than the optical axis of the lens, to activate the light source in the first zone. Alternatively, when the light source in the first zone is activated, the vision machine may deactivate the light source in the fourth zone or in the third zone to reduce the power consumption. If the height of the object on this side is higher than the optical axis of the lens, the light source in the first zone is not activated.

In the above embodiments, the first ray is at 0 degree or 45 degrees from the horizontal direction of the front mirror surface, so as to evenly distinguish the space of the field of view. It should be understood that the direction of the first ray is not limited to this, but may be designed according to external environment in practical application. In the present embodiment, various rays are perpendicular to each other, so that the number of light sources in each zone is the same. It should be understood that in practical application, the included angles between various rays may not be limited to this, and the included angles between various rays may be different, so that the number of light sources in each zone differs according to the requirements for the illumination of the light source, thereby the light of different brightness can be obtained.

The duration of activation of the light source used to illuminate the upper surface of the object may be set as required. For example, the duration of activation of the light source is set to a second time threshold, that is, the vision machine deactivates the light source after the duration of activation of the light source reaches the second time threshold. While the light source is deactivated, the vision machine again activates the light source that was on before this light source is activated.

In the embodiment of the present disclosure, the light sources are arranged in the whole range around the lens, by arranging more light sources for illumination, the flexibility of illumination and the adaptability to illumination requirements are improved, and the FOV of the light source is improved from multiple perspectives, which is beneficial for the improvement of image acquisition quality.

In the above embodiments, due to the influence of the circuits in the components and the differences in the performance of components among individuals, the image frame data (i.e., the measured data) imaged by the image sensor has a certain deviation from an actual real value. During the operation of the vision machine, the temperature of components will also be affected by the circuits, which will lead to the drift of measured data. In the embodiment where multiple light sources are adopted, the layout of the light sources and the installation orientation of the light sources relative to the lens will also affect the measured data.

For example, when the light source is close to the lens, the distance between the light source and the lens may be ignored in an extreme case, a calibration of the measured data is performed. When the light source is far away from the lens, an ideal calibration method adopted when the light source is close to the lens may not be used to calibrate the measured data. That is, when the position of the light source is far away from the lens, additional calibration methods are needed to be used to calibrate the measured data. Therefore, it is necessary to calibrate the measured data using the calibration method based on the measured data and the actual real value, which not only compensates for the difference of components and the influence of temperature, but also corrects the influence of multiple light sources on the measured data, so that the measured data is close to the actual real value.

In addition, in the case where a single light source is used, the single light source and a lens sensor are usually used as one system to obtain a calibration result of the system, therefore, in a vision machine where multiple light sources are used, it is necessary to calibrate the image frame data generated during illumination by different light sources.

Based on above, the calibration method for the vision machine with multiple light sources may be as follows: in order to avoid the mutual influence between light sources, activating different light sources one by one, and illuminating a target having a standard pattern (for example, a standard plate having the standard pattern). The vision machine acquires the image of the standard pattern illuminated by the currently activated light source, thus completing the calibration of the measured data and the actual real value. The correspondence relationship between the information corresponding to the image frame data currently acquired and the light sources is recorded, the information corresponding to the image frame data currently acquired is taken as the calibration result under the illumination of the light source and saved. The calibration result includes the calibration relationship between the measured data (that is, the image frame data currently acquired) and the actual real value.

When the TOF camera is used in the vision machine, the above measured data may be the time difference from activation of the light source to acquisition of the image of the standard plate by the lens, and the actual real value is an actual distance from the standard plate to the lens. Therefore, the calibration relationship between the measured data and the actual real value is the correspondence relationship between the time difference and the actual distance.

Figure 14:
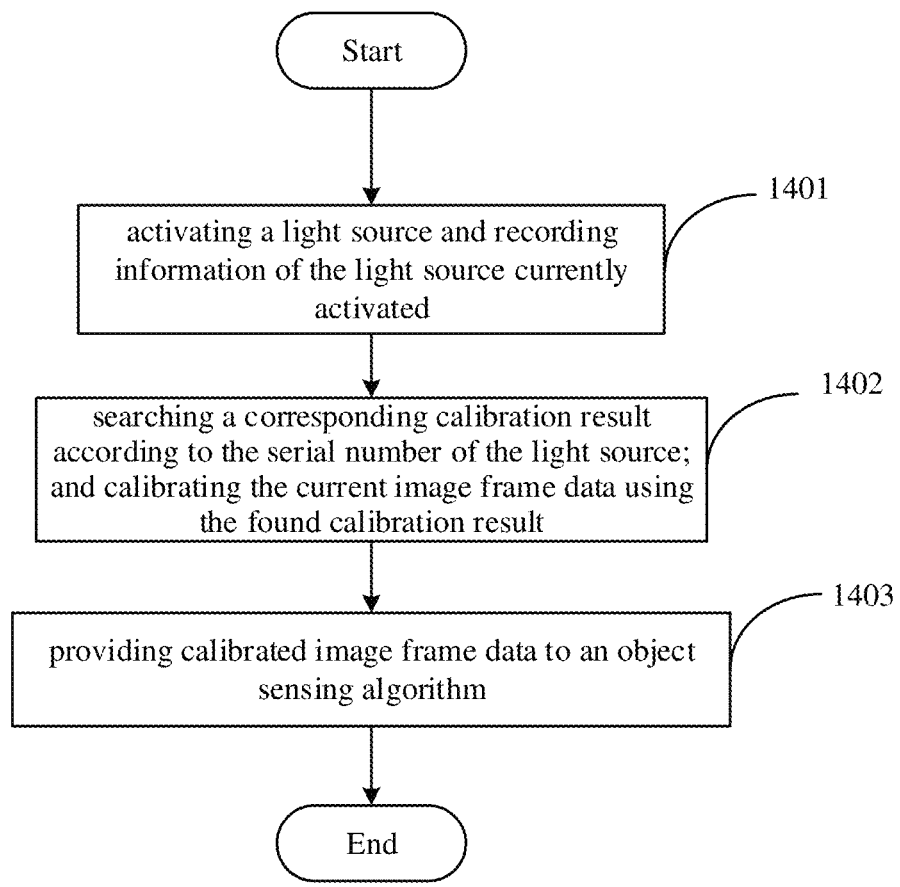
FIG. 14 is a schematic flow chart of sensing objects by a mobile robot that adopts left and right light sources.

To illustrate the calibration of image frame data, the left and right light sources are taken as examples. Referring to FIG. 14, it is a schematic flow chart of sensing objects by a mobile robot that adopts left and right light sources provided by the embodiment of the present disclosure, including the following steps.

Step 1401, activating a light source and recording information of the light source currently activated.

The information of the light source may include the serial number of the light source, and current image frame data acquired, etc.

In step 1401, the left and right light sources may be activated at the same time, or the left or right light sources may be activated alternately in a time-division manner at a high frequency, or the left light source or the right light source may be activated, and the information of the light source currently activated may be recorded.

Step 1402, searching a corresponding calibration result according to the serial number of the light source; and calibrating the current image frame data using the found calibration result. If there are multiple light sources at the moment, the corresponding calibration results are searched respectively according to the information of each light source, and the calibration of the current image frame data is performed using the found calibration results.

For example, the current image frame data is the distance between the object and the lens. The calibration results of light source 1 include: {10 seconds, 2 meters}, {5 seconds, 1 meter}. If the light source currently activated is light source 1, before calibrating the current image frame data, the time difference acquired is 10 seconds and the distance is 1.5 meters, based on the above calibration results, a calibrated distance of the current image frame data is 2 meters.

Step 1403: providing calibrated image frame data to an object sensing algorithm.

The object sensing algorithm in the related art may be adopted, and the object sensing algorithm may be used to determine the moving direction, speed, size and shape of the object, etc., which is not limited herein.

Figure 15:
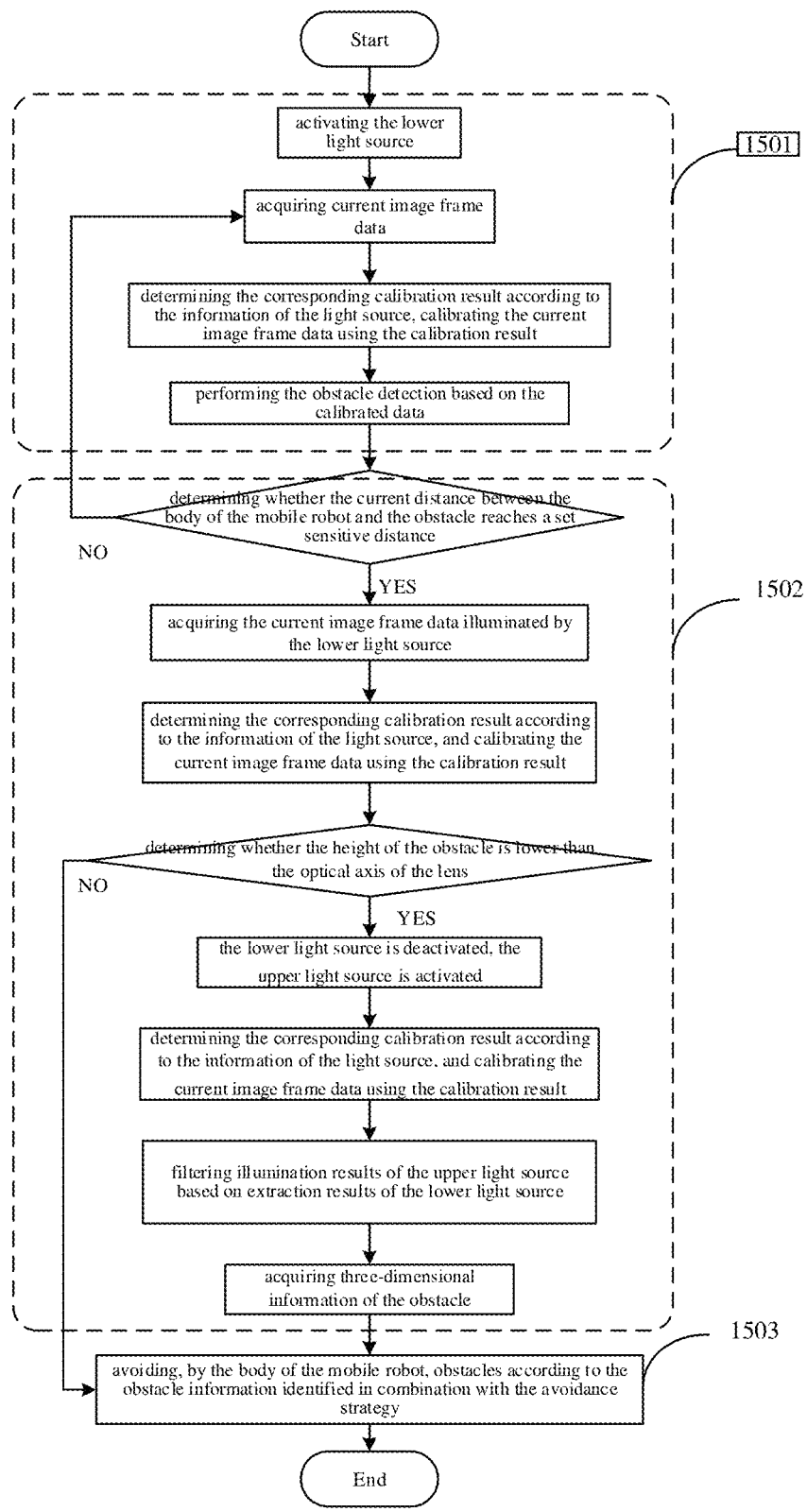
FIG. 15 is a schematic flow chart of sensing obstacles by the mobile robot that adopts upper and lower light sources.

Referring to FIG. 15, it is a schematic flow chart of sensing objects by a mobile robot that adopts upper and lower light sources provided by the embodiment of the present disclosure, including the following steps.

Step 1501, activating the lower light source, using the lower light source to illuminate, acquiring the current image frame data; determining the corresponding calibration result according to the information of the light source, calibrating the current image frame data using the calibration result, and performing the obstacle detection based on the calibrated data.

In the obstacle detection algorithm, when an obstacle is found in the field of view, the positional relationship between the obstacle and the mobile robot is acquired. The obstacle detection algorithm in the related art may be adopted, which is not limited herein.

Figures 16A, 16B:
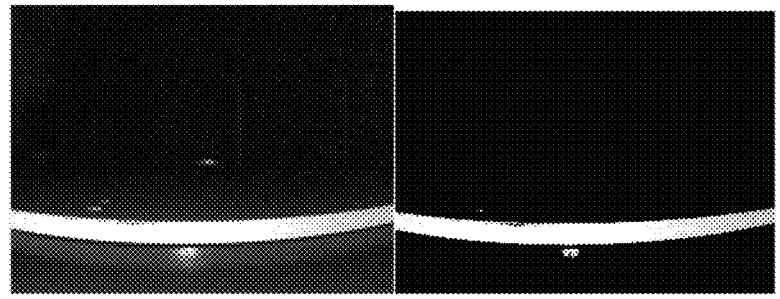

As shown in FIG. 16*a*, it shows a calibrated image acquired under the illumination of a lower light source. When an object (the white part in FIG. 16*a*, and the object is a stick) appears in the FOV of the light source, obstacles in the image may be extracted by using the obstacle detection algorithm, as shown in FIG. 16*b*. FIG. 16*b* shows an image of an obstacle extracted based on FIG. 16*a*.

Figures 16C, 16D:
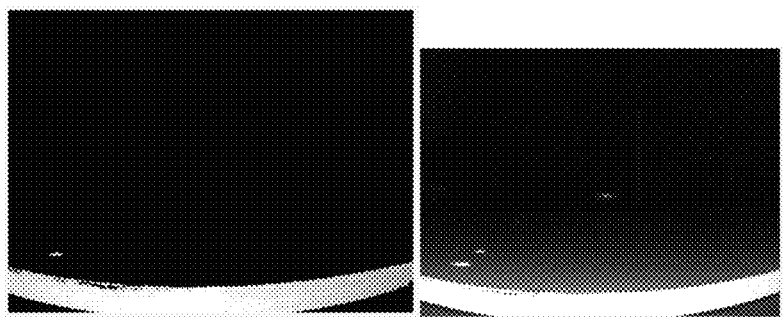
FIG. 16c shows an image of an obstacle extracted under the illumination of a lower light source in step 1502.
FIG. 16d shows a calibrated image acquired under the illumination of an upper light source.

Step 1502, determining whether the current distance between the body of the mobile robot and the obstacle reaches a set sensitive distance; if the current distance reaches the set sensitive distance, acquiring again the current image frame data under the illumination of the lower light source, and determining the corresponding calibration result according to the information of the light source, and calibrating the current image frame data using the calibration result. As shown in FIG. 16*c*, it shows an image of the obstacle extracted under the illumination of a lower light source in step 1502. That is, FIG. 16*c* shows an image of the obstacle extracted under the illumination of the lower light source when the current distance between the body of the mobile robot and the obstacle reaches the set sensitive distance.

Whether the height of the obstacle is lower than the optical axis of the lens is determined according to whether the image contains, above a half of axis y, brightness information; if it is determined that the height of the obstacle is lower than the optical axis of the lens, the lower light source is deactivated, the upper light source is activated, and the current image frame data is acquired; the calibration result is determined according to the information of the light source, and calibration of the current image frame data is performed using the calibration result. As shown in FIG. 16d, it shows a calibrated image acquired under the illumination of the upper light source.

Figure 16E:
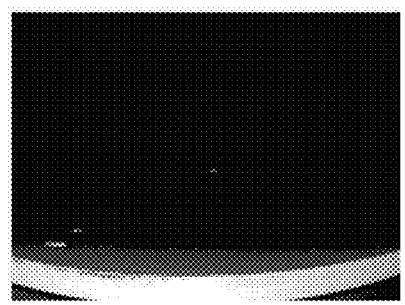
FIG. 16e shows an image of an obstacle extracted based on FIG. 16d.

Since the illumination angle of the upper light source is a depression angle, it is easy to acquire the image of the object on the ground, illumination results of the upper light source may be filtered based on extraction results of the lower light source, to retain the part of the extraction result above the pixels of the lower light source. The extraction results of the lower light source are the results obtained by extracting obstacles in image frame data under the illumination of the lower light source, the extraction results of the lower light source include the sides of obstacles, and the illumination results of the upper light source are the image frame data including the obstacles acquired under the illumination of upper light source. The illumination results under the illumination of the upper light source include the sides and upper surfaces of the obstacles. Filtering illumination results of the upper light source based on extraction results of the lower light source may retain the upper surface of the lower obstacle. As shown in FIG. 16e, it shows an image of an obstacle extracted based on FIG. 16d.

Based on the image data extracted under the illumination of the upper and lower light sources, the three-dimensional information of the obstacle is acquired by using the three-dimensional reconstruction algorithm.

Step 1503, avoiding, by the body of the mobile robot, obstacles according to the obstacle information identified in combination with the avoidance strategy.

Step 1503 may specifically include: the vision machine controls the mobile robot body to avoid obstacles according to the obstacle information identified in combination with the avoidance strategy.

The mobile robot installed with the left and right light sources or upper and lower light sources has a larger FOV of the light source. Specifically, the mobile robot installed with the upper and lower light sources may obtain three-dimensional information of the objects in the field of view, which makes the controlling of the mobile robot more convenient and efficient. It should be understood that, although that the mobile robot installed with the left and right light sources or the upper and lower light sources senses objects and obstacles in the field of view is taken as an example, in practical applications, the light source subsystems of embodiments three and four of the present disclosure may also be applied, and not only to mobile robots, but also to other vision machines.

In addition, for structured light depth camera (referred to as structured light camera for short), on the basis of the layout of multiple light sources, the structured light type of each light source may also be designed. In view of the fact that structured light depth camera calculates the depth from the image sensor to the object by using the deformation of the emitted structured light on the surface of the object, and there is a possibility of "failure" of striped structured light on the surface of some objects, so the object may be illuminated using structured light with different patterns and directions. For example, horizontal striped structured light and vertical striped structured light may alternately illuminate the object to make up for the "failure" of single-directional structured light in some scenes, or the combination of scattered structured light and striped structured light may illuminate the object. Taking embodiment three as an example, among the 4 light sources distributed around the lens, the left and right light sources may be light sources that adopt a first type of structured light, and the upper and lower light sources illuminate the objects using a second type of structured light. For example, in the embodiment four, based on the zones of light sources for illuminating different spaces, different zones adopt different types of structured light (i.e., structured light having different patterns). As shown in FIG. 13a, the light sources in the second and third zones adopt the first type of structured light, and the light sources in the first and fourth zones adopt the second type of structured light. As shown in FIG. 13b, the light sources in the first and the second zones adopt the first type of structured light, and the light sources in the third and the fourth zones adopt the second type of structured light.

The embodiment of the present disclosure further provides a method for controlling a movement of the mobile robot, the mobile robot includes a vision machine, wherein the vision machine includes n light sources distributed on a periphery of a front mirror surface of the vision machine; and n is a natural number greater than or equal to 2. The method includes following steps:

activating the n light sources, and deactivating the n light sources when duration of activation of the n light sources reaches preset duration, and acquiring a first image in the traveling direction of the mobile robot during the activation of the n light sources;

analyzing the first image to obtain an initial position of the object in the traveling direction of the mobile robot;

activating a target light source corresponding to the initial position among the n light sources, and acquiring a second image in the traveling direction of the mobile robot during activation of the target light source;

analyzing the second image to obtain the target position of the object; and controlling the body of the mobile robot to move to avoid the object according to the target position.

The preset duration may be set according to actual requirements. The initial position of the object is the position of the object preliminarily sensed.

According to the method for controlling the movement of the mobile robot, by arranging a plurality of light sources, the field of view of the vision machine is enlarged; by combining with the spatial information of the sensed object, the plurality of light sources may be controlled flexibly, and corresponding light illumination can be provided based on environmental requirements, which reduces the interference signal caused by reflection of a single light source. For the sensed object that is lower than the optical axis of the lens, the light illumination is provided to obtain the image of the upper surface of the sensed object, thereby obtaining the depth information of the sensed object, expanding the sensing range of the vision machine, improving the sensing ability, enriching the application of the vision machine, thus avoiding obstacles more effectively.

In addition, when the target position of the object is determined, only some of the n light sources are activated, which saves resources.

The embodiment of the present disclosure further provides a vision machine, which includes a light source subsystem and an image acquisition subsystem, wherein the light source subsystem includes n light sources distributed on the periphery of the front mirror surface of the vision machine; and n is a natural number greater than or equal to 2.

The processor in the light source subsystem and/or the image acquisition subsystem is configured to execute the steps of the control method for light sources of the vision machine described in any one of embodiments one to four.

The above processor may be a general-purpose processor, including a Central Processing Unit (CPU), a Network Processor (NP), etc., it may also be Digital Signal Processing (DSP), Application Specific Integrated Circuit (ASIC), Field-Programmable Gate Array (FPGA) or other programmable logic devices, discrete gate or transistor logic devices, and discrete hardware components.

The embodiment of the present disclosure further provides a computer-readable storage medium, in which a computer program is stored, and when the computer program is executed by a processor, the steps of implementing the control method for light sources of the visual machine according to any one of embodiments one to four are implemented.

The embodiment of the present disclosure further provides a computer program that, when runs on a computer, causes the computer to execute the steps of the control method for light sources of the vision machine according to any one of embodiments one to four.

Since the embodiments of vision machine/storage medium/computer program are basically similar to the embodiment of the method, the descriptions for them are relatively simple, please refer to the partial descriptions of the embodiments of the method.

Relational terms herein, such as first and second are only used to distinguish one entity or operation from another entity or operation, without necessarily requiring or implying any such actual relationship or sequence between these entities or operations. Moreover, the terms "include", "comprise" or any other variations thereof are intended to cover non-exclusive inclusion, so that a process, method, article or equipment that includes a series of elements includes not only those elements, but also other elements not explicitly listed, or elements inherent to such process, method, article or equipment. Without further restrictions, an element defined by the statement "including one . . . " does not exclude the existence of another identical element in the process, method, article or equipment that includes the said element.

The above embodiments are only the preferred embodiments of the present disclosure, and they are not intended to limit the present disclosure, any modification, equivalent substitution, improvement, etc. made within the spirit and principle of the present disclosure should be included in the scope of protection of the present disclosure.

What is claimed is:

1. A control method for light sources of a vision machine, wherein the control method comprises:
    activating at least one first light source among n light sources and sensing spatial information of an object in a field of view; and
    selectively activating the n light sources according to the spatial information of a sensed object;
    wherein the n light sources are distributed on a periphery of a front mirror surface of a lens of the vision machine, and n is a natural number greater than or equal to 2,
    wherein selectively activating the n light sources according to the spatial information of the sensed object comprises:
        selectively activating one of the light sources among the n light sources, whose field of view corresponds to a space of the sensed object, according to a position and a height of the sensed object, which comprises: determining whether the height of the sensed object is lower than an optical axis of the lens when the sensed object is within a sensitive distance of the vision machine, and if the height of the sensed object is lower than the optical axis of the lens, activating at least one second light source among the n light sources to illuminate an upper surface of the sensed object, wherein the sensitive distance is a maximum perpendicular distance from an object required to be sensed to a bearing surface, and the bearing surface is a plane where the front mirror surface of the lens is located,
    wherein the periphery is a circumference having a first radius, and taking a center of the front mirror surface as a circle center, and the first radius is at least larger than a radius of the front mirror surface,
    wherein the n light sources are evenly distributed on the circumference, and a polygon formed by the n light sources takes a vertical straight line passing through the center of the front mirror surface as a symmetry axis, wherein n is a natural number greater than or equal to 3;
    wherein the method further comprises determining illumination angles of the n light sources and a distance between each light source and the center of the front mirror surface, when being designed, according to a sensitive height of the object required to be sensed, in combination with an illumination cone of the light source and/or light transmittance of the lens, wherein the sensitive height is a height of the object required to be sensed; wherein
    selectively activating the light source among the n light sources, whose field of view corresponds to the space of the sensed object, according to the position and the height of the sensed object comprises:
    dividing the n light sources into m zones of light sources according to illumination position areas of the field of view, wherein m is a natural number greater than 1;
    selectively activating the light source in the zone corresponding to the space of the sensed object according to the position and the height of the sensed object; and wherein
    the control method further comprises:
    calibrating an image under illumination of each of the light sources to obtain a calibration result of each of the light sources, and calibrating current image frame data acquired under illumination of each of the light sources using the calibration result.

2. The control method according to claim 1, wherein activating at least one first light source of the n light sources comprises: activating all light sources among the n light sources, or activating each light source among the n light sources alternately in a time-division manner at a certain frequency.

3. The control method according to claim 1, wherein dividing the n light sources into m zones of light sources according to illumination position areas of the field of view comprises:
    dividing the n light sources distributed on the circumference into m zones of light sources using m rays starting from the center of the front mirror surface.

4. The control method according to claim 3, wherein m is 4, a first ray points to a left side of the vision machine in a horizontal direction of the front mirror surface, a second ray is perpendicular to the first ray, a third ray is perpendicular to the second ray, a fourth ray is perpendicular to the third ray, and the m zones comprise:
    a first zone located between the fourth ray and the first ray, a second zone located between the first ray and the second ray, a third zone located between the second ray and the third ray, and a fourth zone located between the third ray and the fourth ray; wherein the light source in the first zone is used to illuminate an upper left side of a traveling direction of the vision machine, the light source in the second zone is used to illuminate a lower left side of the traveling direction of the vision machine, the light source in the third zone is used to illuminate a lower right side of the traveling direction of the vision machine, and the light source in the fourth zone is used to illuminate an upper right side of the traveling direction of the vision machine; and wherein selectively activating the light source in the zone corresponding to the space of the sensed object according to the position and the height of the sensed object comprises:

if the sensed object is located on a right side of the traveling direction of the vision machine, activating the light source in the third zone; determining whether the height of the sensed object is lower than the optical axis of the lens, and if so, activating the light source in the fourth zone to illuminate the upper surface of the sensed object;

if the sensed object is located on a left side of the traveling direction of the vision machine, activating the light source in the second zone; determining whether the height of the sensed object is lower than the optical axis of the lens, and if so, activating the light source in the first zone to illuminate the upper surface of the sensed object;

if the sensed object is located in the middle of the traveling direction of the vision machine, activating the light sources in the second zone and the third zone; determining whether the height of the sensed object is lower than the optical axis of the lens, and if so, activating the light sources in the first zone and the fourth zone to illuminate the upper surface of the sensed object; and if there are objects on the left side and the right side of the traveling direction of the vision machine at the same time, activating the light sources in the second zone and the third zone at the same time, or activating the light sources in the second zone and the third zone alternately in a time-division manner at a certain frequency; determining whether there is a sensed object whose height is lower than the optical axis of the lens, and if so, activating the light sources in the first zone and the fourth zone to illuminate the upper surface of the sensed object lower than the optical axis of the lens.

5. The control method according to claim 4, wherein selectively activating the light source in the zone corresponding to the space of the sensed object according to the position and the height of the sensed object further comprises deactivating the light source currently activated when activating the light source for illuminating the upper surface of the sensed object.

6. The control method according to claim 3, wherein m is 4, the first ray points to the left side of the traveling direction of the vision machine at 45 degrees from the horizontal direction of the front mirror surface, the second ray is perpendicular to the first ray, the third ray is perpendicular to the second ray, and the fourth ray is perpendicular to the third ray, and the m zones comprises:

a first zone located between the fourth ray and the first ray, a fourth zone located between the first ray and the second ray, a second zone located between the second ray and the third ray, and a third zone located between the third ray and the fourth ray; wherein the light source in the first zone is used to illuminate an upper side of the traveling direction of the vision machine, the light source in the second zone is used to illuminate a lower side of the traveling direction of the vision machine, the light source in the third zone is used to illuminate the right side of the traveling direction of the vision machine, and the light source in the fourth zone is used to illuminate the left side of the traveling direction of the vision machine; and wherein selectively activating the light source in the zone corresponding to the space of the sensed object according to the position and the height of the sensed object comprises:

if the sensed object is located on the right side of the traveling direction of the vision machine, activating the light source in the third zone; determining whether the height of the sensed object is lower than the optical axis of the lens, and if so, activating the light source in the first zone to illuminate the upper surface of the sensed object;

if the sensed object is located on the left side of the traveling direction of the vision machine, activating the light source in the fourth zone; determining whether the height of the sensed object is lower than the optical axis of the lens, and if so, activating the light source in the first zone to illuminate the upper surface of the sensed object;

if the sensed object is located in the middle of the traveling direction of the vision machine, activating the light source in the second zone; determining whether the height of the sensed object is lower than the optical axis of the lens, and if so, activating the light source in the first zone to illuminate the upper surface of the sensed object; and if there are objects on the left side and the right side of the traveling direction of the vision machine at the same time, activating the light sources in the fourth zone and the third zone at the same time, or activating the light sources in the fourth zone and the third zone alternately in a time-division manner at a certain frequency; determining whether there is a sensed object whose height is lower than the optical axis of the lens, and if so, activating the light source in the first zone to illuminate the upper surface of the sensed object.

7. The control method according to claim 1, wherein determining whether the height of the sensed object is lower than the optical axis of the lens comprises determining whether an image pixel coordinate system contains, above a half of axis y, brightness information, and if so, determining that the height of the sensed object is higher than the optical axis of the lens, otherwise, determining that the height of the object is lower than the optical axis of the lens.

8. The control method according to claim 7, wherein the n light sources are light sources of structured light having different patterns, the first light source is a light source of structured light having a first pattern, and the second light source is a light source of structured light having a second pattern.

9. The control method according to claim 1, wherein calibrating the image under illumination of each of the light sources to obtain the calibration result of each of the light sources comprises:

activating each of the light sources respectively to illuminate a target having a standard pattern, acquiring an image of the standard pattern under illumination of the light source activated, recording correspondence relationship between image frame data currently acquired and the light source activated, taking recorded image frame data as the calibration result that is under illumination of the light source activated, and saving the calibration result;

wherein calibrating current image frame data acquired under illumination of each of the light sources using the calibration result comprises, activating the light source, recording information of the light source currently activated, and collecting the current image frame data, searching the calibration result corresponding to the light source currently activated according to the information of the light source currently activated; and calibrating the current image frame data using a found calibration result.

10. A vision machine, comprising:
a light source subsystem, wherein the light source subsystem comprises n light sources distributed on a periphery of a front mirror surface of the vision machine; n is a natural number greater than or equal to 2; and a processor in the vision machine configured to execute the control method for light sources according to claim 1.

11. A method for controlling a movement of a mobile robot, wherein the mobile robot comprises the vision machine according to claim 10, and the vision machine comprises n light sources distributed on a periphery of a front mirror surface of the vision machine; n is a natural number greater than or equal to 2; wherein the method comprises:

activating the n light sources, and deactivating the n light sources when duration of activation of the n light sources reaches preset duration, and acquiring a first image in a traveling direction of the mobile robot during the activation of the n light sources;

analyzing the first image to obtain an initial position of an object in the traveling direction of the mobile robot;

activating a target light source corresponding to the initial position among the n light sources, and acquiring a second image in the traveling direction of the mobile robot during activation of the target light source;

analyzing the second image to obtain a target position of the object; and controlling a body of the mobile robot to move to avoid the object according to the target position.

12. A non-transitory computer-readable storage medium, wherein a computer program is stored in the computer-readable storage medium, and when the computer program is executed by a processor, the control method for light sources according to claim 1 is implemented.

* * * * *